United States Patent
Suekane et al.

(10) Patent No.: US 7,525,697 B2
(45) Date of Patent: Apr. 28, 2009

(54) WHITE BALANCE PROCESSING APPARATUS AND PROCESSING METHOD THEREOF

(75) Inventors: Hisashi Suekane, Hachioji (JP); Hiroyuki Watanabe, Yokohama (JP); Akira Yukitake, Kokubunji (JP); Koh Yokokawa, Akishima (JP)

(73) Assignee: Olympus Corporation, Tokyo (JP)

( * ) Notice: Subject to any disclaimer, the term of this patent is extended or adjusted under 35 U.S.C. 154(b) by 1062 days.

(21) Appl. No.: 10/620,118

(22) Filed: Jul. 15, 2003

(65) Prior Publication Data

US 2004/0017594 A1   Jan. 29, 2004

(30) Foreign Application Priority Data

Jul. 15, 2002   (JP)   ............................. 2002-205013
Nov. 19, 2002  (JP)   ............................. 2002-334852

(51) Int. Cl.
*H04N 1/04* (2006.01)

(52) U.S. Cl. .................. 358/474; 358/518; 358/516; 358/523; 358/520; 358/1.15; 382/274; 382/167; 348/333.02; 348/222.1; 396/661

(58) Field of Classification Search ................ 358/474, 358/516, 522, 523, 501, 518, 520, 1.15, 527, 358/475, 509, 537, 524, 504, 505; 382/169, 382/251, 274, 165, 272, 167, 172, 275, 305; 348/333.02, 222.1, E5.022; 396/661
See application file for complete search history.

(56) References Cited

U.S. PATENT DOCUMENTS

| 5,146,323 | A | * | 9/1992 | Kobori et al. ................ 358/527 |
| 5,479,206 | A | * | 12/1995 | Ueno et al. ............... 348/211.5 |
| 5,585,942 | A | * | 12/1996 | Kondo ......................... 358/474 |
| 5,821,993 | A | * | 10/1998 | Robinson .................... 348/187 |
| 6,046,827 | A | * | 4/2000 | Ogoshi et al. ............... 358/487 |
| 6,628,830 | B1 | * | 9/2003 | Yamazoe et al. ............ 382/168 |
| 6,906,744 | B1 | * | 6/2005 | Hoshuyama et al. ..... 348/223.1 |
| 6,958,834 | B1 | * | 10/2005 | Ide ............................. 358/505 |
| 7,158,174 | B2 | * | 1/2007 | Gindele et al. ........... 348/224.1 |
| 7,184,079 | B2 | * | 2/2007 | Hoshuyama ............. 348/223.1 |
| 7,414,758 | B2 | * | 8/2008 | Vaughn ....................... 358/474 |
| 2002/0167598 | A1 | * | 11/2002 | Oeda et al. .............. 348/223.1 |
| 2003/0206319 | A1 | * | 11/2003 | Kondo ........................ 358/516 |

FOREIGN PATENT DOCUMENTS

| JP | 10304386 | 11/1998 |
| JP | 11355784 | 12/1999 |
| JP | 2000299814 | 10/2000 |
| JP | 2002185972 | 6/2002 |

\* cited by examiner

*Primary Examiner*—Negussie Worku
(74) *Attorney, Agent, or Firm*—Volpe and Koenig, P.C.

(57) ABSTRACT

Disclosed herein is a white balance processing apparatus including: white balance processing means for effecting white balance processing on a taken image based on a set white balance value; storage means for storing white balance values employed in the white balance processing of past taken images; and employed value setting means for setting a white balance value employed in the past, stored in the storage means as the white balance value for the taken image.

13 Claims, 17 Drawing Sheets

WHITE BALANCE PROCESSING APPARATUS AND PROCESSING METHOD THEREOF

CROSS REFERENCE TO RELATED APPLICATIONS

This application claims benefits of Japanese Patent Applications No. 2002-205013 filed in Japan on Jul. 15, 2002, and No. 2002-334852 filed in Japan on Nov. 19, 2002, the contents of which are incorporated by those references.

BACKGROUND OF THE INVENTION

The present invention relates to white balance processing apparatus and processing method thereof in which pickup images can be readily processed at white balance values of desired color tone, and also relates to a program for executing such processing method and to digital cameras using such white balance processing apparatus.

In imaging apparatus such as a digital camera, white balance adjustment is indispensable in recording taken images. The techniques for such white balance adjustment include an automatic white balance, preset white balance, one-touch white balance, manual white balance, etc.

The most frequently used technique is the automatic white balance (AWB). In this technique, a fetched pickup image is analyzed at the inside of the imaging apparatus to compute an optimal white balance value, and white balance processing is effected on the taken image by using the computed white balance value. Since, however, the white balance adjustment is an adjustment of color condition and involves highly subjective elements, a white balance adjustment based on a theoretically correct white balance value obtained by the automatic white balance technique is not necessarily preferred.

By contrast, there is a technique referred to as preset white balance adjustment. In this technique, the white balance processing is effected by a white balance value which is designated by the photographer from those white balance values previously stored to the imaging apparatus before its shipping from factory, i.e., white balance values corresponding for example to the light sources of fluorescent lamp, incandescent lamp, outdoors, etc.

Further, there is a technique referred to as one-touch white balance adjustment. In this technique, a preliminary image of a white object is taken before the main image taking under the image taking condition to previously set a white balance value, and white balance processing is effected on the pickup image by such set white balance value.

Among other prior-art techniques relating to white balance processing, Japanese patent application laid-open No. 2000-299814 discloses a technique in which the setting of white balance is selected from an automatic setting and a customized setting of the user. Further, Japanese patent application laid-open Hei-10-304386 discloses for example a technique in which an automatic white balance (AWB) function is also locked concurrently with AF and AE functions by the half-pressed manipulation (1st manipulation) of the release switch in taking an image.

Further, Japanese patent application laid-open Hei-11-355784 discloses a digital camera capable of selecting from an automatic white balance adjustment mode and a manual white balance adjustment mode in which the photographer can manually make an adjustment based on a color temperature information.

Furthermore, Japanese patent application laid-open No. 2002-185972 discloses a digital camera in which an achromatic color region is distinguishably displayed on image displayed on an image displaying LCD monitor of digital camera so that a suitable white balance can be set while checking such displayed image.

SUMMARY OF THE INVENTION

It is an object of the present invention to provide a white balance processing apparatus and processing method thereof in which taken images can be readily processed by a white balance value of desired color tone. Further, it is another object of the invention to provide a white balance processing apparatus, processing method thereof, and digital camera using same in which an adjustment and setting of white balance value of desired color tone can be objectively and readily effected at high accuracy.

In a first aspect of the invention, there is provided a white balance processing apparatus including: white balance processing means for effecting white balance processing on a taken image based on a set white balance value; storage means for storing white balance values employed in the white balance processing of past taken images; and employed value setting means for setting a white balance value employed in the past, stored in the storage means as the white balance value for the taken image.

In a second aspect of the invention, the white balance processing apparatus according to the first aspect further includes detected value setting means for detecting and setting a white balance value to be set for the white balance processing from the taken image. The storage means stores the white balance value set by the detected value setting means and employed in the white balance processing as a white balance value employed in the past.

In a third aspect of the invention, the white balance processing apparatus according to the second aspect includes: selection means for selecting the employed value setting means or the detected value setting means as means for setting the white balance value; and forced setting means for, when the detected value setting means is selected by the selection means, switching the detected value setting means to the employed value setting means only during a specifically designated period.

In a fourth aspect of the invention, the white balance processing apparatus according to the third aspect further includes register means for causing the white balance value employed in the white balance processing of the taken image displayed on a display means to be stored to the storage means.

In a fifth aspect of the invention, the white balance processing apparatus according to the first aspect further includes: preset value storage means for storing preset white balance values that are previously set white balance values; correction means for correcting the preset white balance values; and corrected preset value setting means for setting the corrected preset white balance value for the white balance processing. The storage means stores the corrected preset white balance value set and employed in the white balance processing as a white balance value employed in the past.

In a sixth aspect of the invention, the white balance processing apparatus according to any one of the first to fifth aspects further includes: retaining means for retaining a white balance value employed in the white balance processing at the white balance processing means; and a register means for registering the white balance value retained at the retaining means to the storage means.

In a seventh aspect of the invention, the retaining means of the white balance processing apparatus according to the sixth aspect retains a plurality of white balance values employed in the white balance processing, and the register means selects a predetermined white balance value from the plurality of white balance values and registers it to the storage means.

In an eighth aspect of the invention, there is provided a white balance processing apparatus including: white balance processing means for effecting white balance processing on a taken image based on a set white balance value; and setting means for setting, as the white balance value for the white balance processing, a white balance value read out from recorded taken image data, employed in white balance processing of that taken image.

In a ninth aspect of the invention, the white balance processing apparatus according to any one of the first to eighth aspects further includes setting enabling means for enabling a setting of white balance value only when there is a coincidence between presence/absence of flash emission for the taken image and presence/absence of flash emission for image taken at the time of acquiring the white balance value set for the white balance processing of the taken image.

In a tenth aspect of the invention, there is provided a digital camera having the white balance processing apparatus according to any one of the first to eighth aspects mounted thereon.

In an eleventh aspect of the invention, there is provided a digital camera having the white balance processing apparatus according to the ninth aspect mounted thereon.

In a twelfth aspect of the invention, there is provided a white balance processing method including the steps of: storing a white balance value employed in white balance processing of past taken image; and effecting white balance processing on a taken image by using the stored white balance value employed in the past as the white balance value for the taken image.

In a thirteenth aspect of the invention, the stored white balance value employed in the past in the white balance processing method according to the twelfth aspect is a white balance value detected from a taken image processed in the past and is the white balance value employed in the white balance processing of the taken image.

In a fourteenth aspect of the invention, there is provided a white balance processing program for causing a computer to execute the procedures of: storing a white balance value employed in white balance processing of past taken image; and effecting white balance processing on a taken image by using the stored white balance value employed in the past as the white balance value for the taken image.

In a fifteenth aspect of the invention, there is provided a white balance processing apparatus including: white balance processing means for effecting white balance processing on an image to be taken; color histogram processing means for effecting histogram processing by color components in accordance with the image to be taken processed of white balance by the white balance processing means; and display means for displaying histograms by color components obtained by the color histogram processing means.

In a sixteenth aspect of the invention, the color histogram processing means of the white balance processing apparatus according to the fifteenth aspect effects histogram processing by color components by separating the image to be taken of an entire image frame and the image to be taken of a specific regional portion set within the image frame.

In a seventeenth aspect of the invention, the display means in the white balance processing apparatus according to the sixteenth aspect displays by color components the histogram concerning the entire image frame and the histogram concerning the specific regional portion by the color histogram processing means so that they can be compared with each other.

In an eighteenth aspect of the invention, the white balance processing apparatus according to any one of the fifteenth to seventeenth aspects further includes display control means for effecting control to display the histograms by color components on the display means when a setting screen for setting white balance is displayed on the display means.

In a nineteenth aspect of the invention, the display means in the white balance processing apparatus according to any one of the fifteenth to eighteenth aspects concurrently displays information concerning adjusting conditions of white balance of the white balance processing means.

In a twentieth aspect of the invention, the information concerning the adjusting conditions of white balance in the white balance processing apparatus according to the nineteenth aspect is information indicating types of mode of white balance that can be selected.

In a twenty-first aspect of the invention, the information concerning the adjusting conditions of white balance in the white balance processing apparatus according to the nineteenth aspect is information concerning ratio about a specific color component processed of the histogram processing.

In a twenty-second aspect of the invention, the display means in the white balance processing apparatus according to any one of the fifteenth to twenty-first aspects in addition concurrently displays the image to be taken.

In a twenty-third aspect of the invention, the display means in the white balance processing apparatus according to the twenty-second aspect additionally displays a white balance detecting region on the image to be taken.

In a twenty-fourth aspect of the invention, the color histogram processing means in the white balance processing apparatus according to any one of the fifteenth to twenty-third aspects effects histogram processing by the three color components of RGB.

In a twenty-fifth aspect of the invention, there is provided a digital camera having the white balance processing apparatus according to any one of the fifteenth to twenty-fourth aspects mounted thereon.

In a twenty-sixth aspect of the invention, there is provided a white balance processing method including the steps of: effecting white balance processing on an image to be taken; effecting histogram processing by color components in accordance with the image to be taken processed of the white balance processing; and displaying a histogram by color components obtained by the histogram processing together with the image to be taken.

In twenty-seventh aspect of the invention, there is provided a white balance processing program for causing a computer to execute the procedures of: effecting white balance processing with respect to an image to be taken; effecting histogram processing by color components in accordance with the image to be taken processed of the white balance processing; and displaying histograms by color components obtained by the histogram processing together with the image to be taken.

DESCRIPTION OF THE PREFERRED EMBODIMENTS

Figure 1:
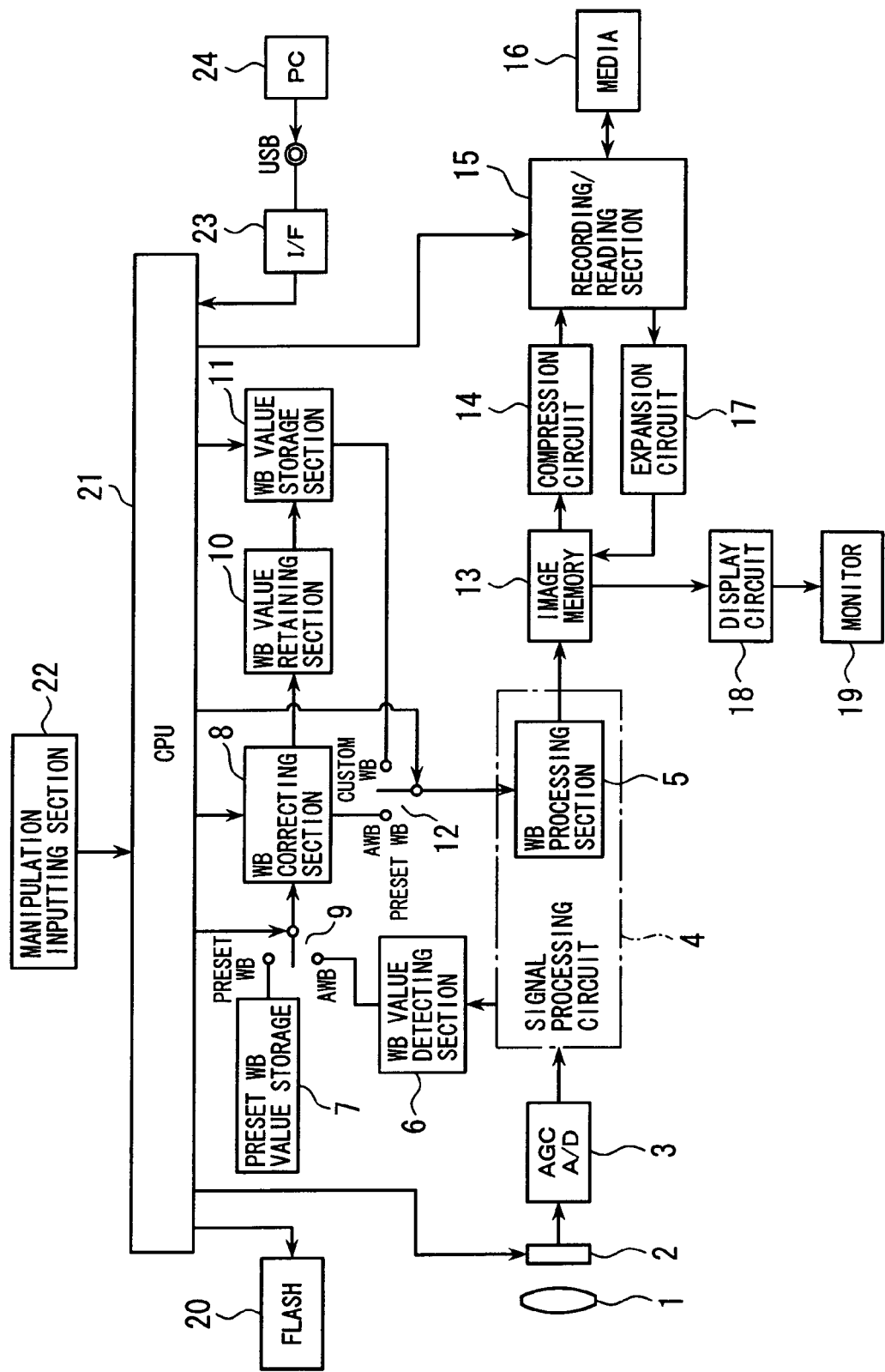
FIG. 1 is a block diagram schematically showing a digital camera to which a first embodiment of the white balance processing apparatus and processing method thereof according to the present invention is applied.

Some embodiments of the invention will now be described. FIG. 1 is a block diagram schematically showing a digital camera to which a first embodiment of the white balance processing apparatus and processing method thereof according to the invention is applied. FIG. 1 includes: 1, a lens for forming an object image; 2, an imaging device such as CCD for converting the incoming object light image into electrical signals; 3, AGC☐A/D conversion circuit for controlling gain of and effecting analog-to-digital conversion of image pickup signals from the imaging device 2; 4, a signal processing circuit including a white balance processing section 5; 6, a white balance value detecting section for detecting white balance values from taken images: 7, a preset white balance value storage section for storing preset white balance values previously set at the time of shipping from factory; 8, a white balance correcting section for correcting the white balance values (AWB value) detected at the white balance value detecting section 6 or the preset white balance values stored at the preset white balance storage section 7; and 9, a white balance input changeover switch for switching the input to the white balance correcting section 8 between the preset white balance value and the detected white balance value (AWB value).

It further includes: 10, a white balance value retaining section for temporarily retaining a corrected white balance value; 11, a white balance value storage section for storing the corrected white balance value retained at the white balance value retaining section 10 as a custom white balance value; and 12, a white balance output changeover switch for providing output to the white balance processing section 5 by switching between the corrected, detected white balance value or preset white balance value and the custom white balance value.

It furthermore includes: 13, an image memory for storing image data after the white balance processing; 14, a compression circuit for compressing image data read out from the image memory 13; 15, a recording/reading section for recording compressed image data to media 16 such as a memory card and reading the image data from the media 16; 17, an expanding circuit for expanding the image data read out from the media 16; 18, a display circuit for displaying the image data stored at the image memory 13 onto a monitor 19; 20, a flash mechanism for flash photography; 21, CPU for controlling the respective component members; 22, a manipulation inputting section for effecting various inputs to CPU 21 from the respective sections; and 24 an external personal computer connected to CPU 21 through an interface 23.

It should be noted that the instructions effected from the above described manipulation inputting section 22 for example includes: the switching of the automatic, preset and custom white balance modes; registration of a custom white balance value from the white balance value retaining section 10 to the white balance value storage section 11; selection of custom white balance value; and correction value of white balance value.

Figure 2:
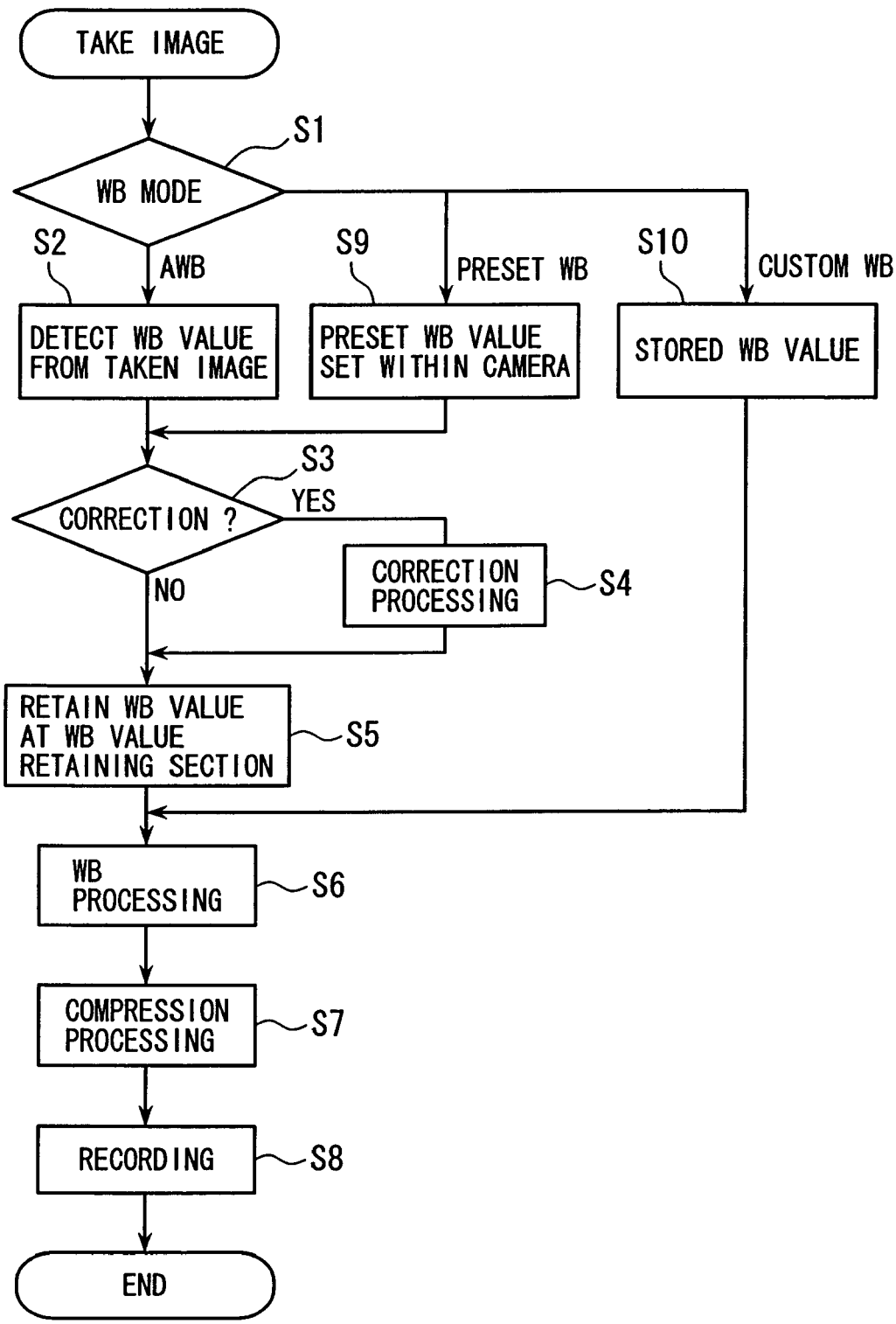
FIG. 2 is a flowchart for explaining an operation of the first embodiment shown in FIG. 1.

A description will now be given with reference to the flowchart of FIG. 2 with respect to an image taking operation of the digital camera to which the first embodiment having such construction is applied. The white balance value setting modes in this embodiment are: AWB mode for setting a white balance value detected from taken image; custom white balance mode for setting a stored custom white balance value; and preset white balance mode for setting a preset white balance value. The operation in AWB mode will be first described.

Figure 3:
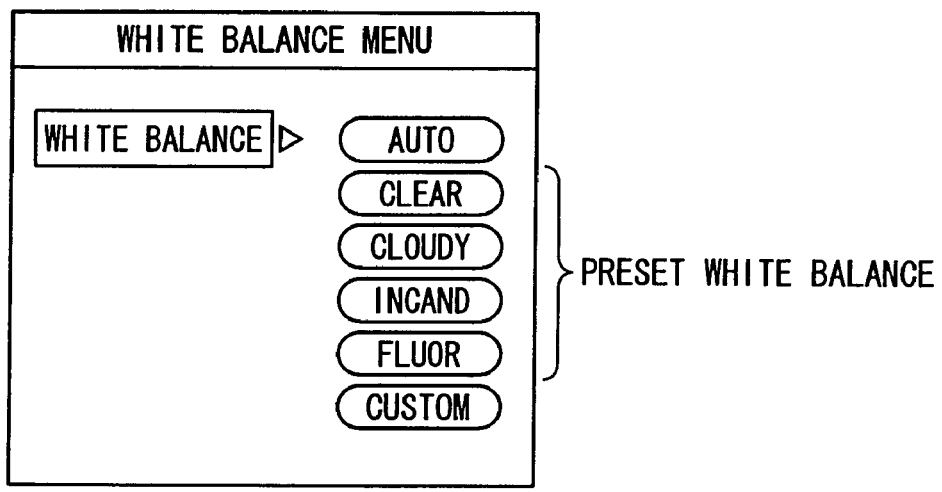
FIG. 3 shows a white balance menu display in the first embodiment.

The photographer (user) causes a white balance menu having choices of white balance as shown in FIG. 3 to be displayed and sets AWB (automatic) mode as the white balance mode. When the image taking is started by the pressing of a release button, it is first judged as AWB mode at the determining step of white balance mode (step S1). A white balance value is then detected at the white balance value detecting section 6 for each image taking (step S2). The detected white balance value is inputted to the white balance correcting section 8 through the white balance input changeover switch 9 and it is decided by the photographer (user) whether a correction is necessary or not (step S3). If a correction is decided to be necessary, the correction is made according to a white balance correcting value (fine adjustment between red and blue) set by the photographer (step S4). The corrected detected white balance value or the detected white balance value without requiring correction is retained at the white balance value retaining section 10 (step S5).

The taken image on the other hand is processed of white balance at the white balance processing section 5 by the corrected or not-corrected detected white balance value outputted from the white balance correcting section 8 through the white balance output changeover switch 12 (step S6). The taken image processed at the white balance processing section 5 is stored to the image memory 13 and then compressed at the compression circuit 14 (step S7) and recorded to the media 16 through the recording/reading section 15 (step S8). At the same time, the image data read out from the image memory 13 is displayed on the monitor 19 through the display circuit 18 (rec-view).

Seeing the displayed image on the monitor 19 by the rec-view operation or the recorded image reproduced and displayed onto the monitor 19 from media 16 by a quick reproducing operation, the photographer, if judges it as a desirable white balance value, causes the white balance value retained at the white balance value retaining section 10 corresponding to the taken image to be stored to the white balance value storage section 11 as a custom white balance value.

Figure 4:
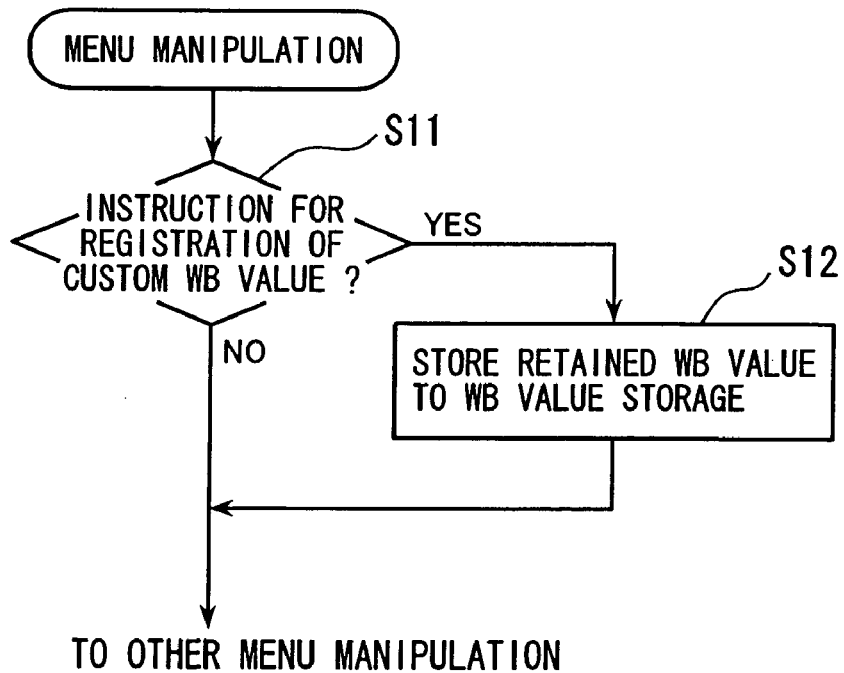
FIG. 4 is a flowchart for explaining the operation of registering/storing process of custom white balance value in the first embodiment

The storing operation to the storage section 11 as a custom white balance value is shown in the flowchart of FIG. 4. In particular, while this storing operation is effected by a menu manipulation, it is first determined whether an instruction for registration as a custom white balance value has been given or not (step S1). If an instruction for registration has been given, the white balance value retained at the white balance value retaining section 10 is stored to the white balance value storage section 11 (step S12).

It should be noted that the white balance value storage section 11 is formed of a memory for example a RAM with back-up power supply or a rewritable ROM such as flash memory which does not lose information even when the power is turned off. Further, the white balance value at the white balance value retaining section 10 may be updated at every image taking or it is also possible to retain the respective white balance values of a plurality of image taking. If a plurality of white balance values are retained at the white balance value retaining section 10, the storing to the white balance value storage section 11 is selectively effected. The operation in this manner is advantageous for example when a plurality of images are to be taken by one time of image taking operation in taking a multiple of images at short intervals or bracket imaging (taking of a multiple of image in a short time period with changing the imaging condition).

The image taking operation at the time of custom white balance mode will now be described. The photographer causes the white balance menu shown in FIG. 3 to be displayed and sets white balance mode to the custom white balance mode. It is thereby judged as the custom white balance mode at the determining step S1 of white balance mode. In this case, a custom white balance value stored at the white balance value storage section 11 is read out through the white balance output changeover switch 12 (step S10). A white balance processing is then performed on taken image at the white balance processing section 5 by using the custom white balance value (step S6). Thereafter, a compression processing is similarly effected and the recording to media 16 is made.

The image taking operation at the time of the preset white balance mode will now be described. In this case, the photographer similarly causes the white balance menu shown in FIG. 3 to be displayed and selects and sets a preset white balance value (white balance value corresponding to the clear sky, cloudy sky, incandescent lamp or fluorescent lamp) provided in the preset white balance value storage section 7 previously set to the camera for example at the time of shipping from factory. It is thereby judged as the preset white balance mode at the determining step S1 of white balance mode. The selected preset white balance value is then read out from the preset white balance value storage section 7 (step S9). The selected preset white balance value is then inputted to the white balance correcting section 8 through the white balance input changeover switch 9 and, if required, is corrected by a white balance correcting value set by the photographer (steps S3, S4). The preset white balance value corrected or not corrected at the white balance correcting section 8 is supplied to the white balance processing section 5 through the white balance output changeover switch 12 so as to effect white balance processing of the taken image by the preset white balance value.

Further, the preset white balance value corrected at the white balance correcting section 8 is at the same time retained at the white balance value retaining section 10. The photographer then causes the corrected preset white balance value to be stored to the white balance value storage section 11 as a custom white balance value so that it can be used at the time of the custom white balance mode. By storing the corrected preset white balance value as a custom white balance value, advantages are obtained as follows. For example, there are various types of fluorescent lamps from daylight to white and the color tone thereof is delicately different from one maker to another. It is thus convenient to store the preset white balance value suitably corrected by the photographer corresponding to such color tone as a custom white balance value, since it can be readily used in the next image taking.

A second embodiment of the invention will now be described. The fundamental construction of a digital camera to which this embodiment is applied is similar to that of the first embodiment shown in FIG. 1 and a diagrammatic explanation thereof will be omitted. The first embodiment has been shown as one in which the retained white balance value detected/acquired in AWB mode is stored as a custom white balance value so that it can be used at the time of the custom white balance mode. In the present embodiment, a white balance lock means (not separately shown) is directed by the manipulation inputting section 22 when an image is being taken in AWB mode to effect a white balance lock by the white balance lock means. Only in the period during which the white balance lock is effected, the white balance processing by the white balance value stored at the white balance value storage section 11 is possible.

Figure 5:
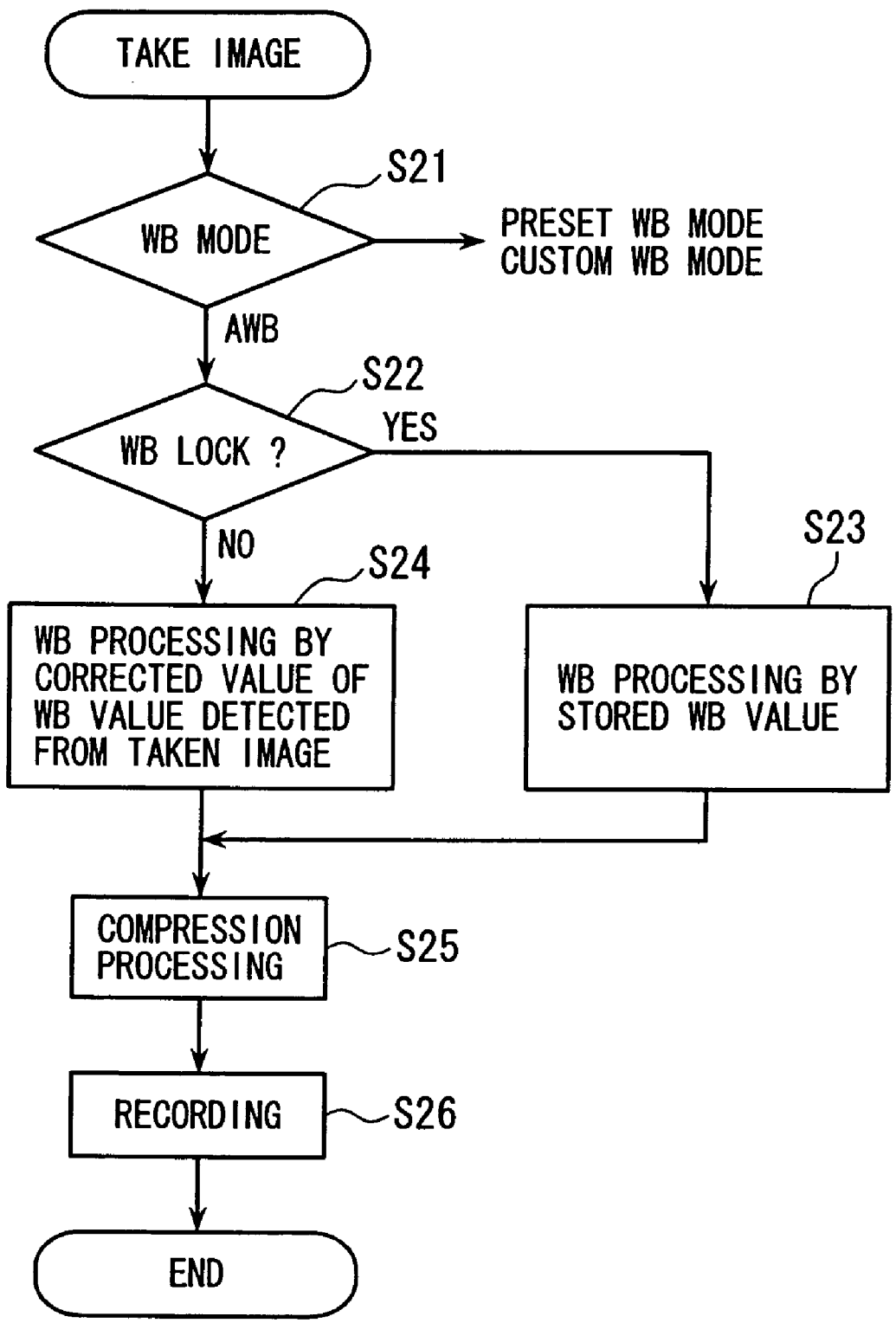
FIG. 5 is a flowchart for explaining operation of a second embodiment of the invention.

The image taking operation of the second embodiment will now be described in more detail with reference to the flowchart shown in FIG. 5. When an image is taken in AWB mode by the photographer, white balance processing of the taken image is effected by a white balance value obtained by correcting a detected white balance value and at the same time the corrected white balance value is retained at the white balance value retaining section 10. If a white balance value is already retained thereat, it is replaced by the new white balance value. If, while such image taking in AWB mode is being performed, the photographer finds that a favorable white balance value is obtained for the taken image displayed on the monitor 19 by a rec-view or quick reproduction, a white balance lock is effected by manipulating a lock button at the manipulation inputting section 22. In this case, as shown in the flowchart of FIG. 5, it is judged as AWB mode at the white balance mode determining step S21 and judged as white balance lock at the white balance lock determining step S22.

If the white balance lock manipulation is effected, the corrected white balance value retained at the white balance value retaining section 10 is stored to the white balance value storage section 11. Until the unlocking of the white balance lock by a lock button manipulation at the manipulation inputting section 22, then, white balance processing of taken image is effected by the white balance value stored at the white balance value storage section 11 (step S23). If on the other hand the white balance lock is not effected, the white balance processing is effected in the same manner as before by using a white balance value corrected after its detection from the taken image (step S24). Thereafter, a compression processing is similarly effected (step S25) and the recording to media 16 is made (step S26).

Figure 6:
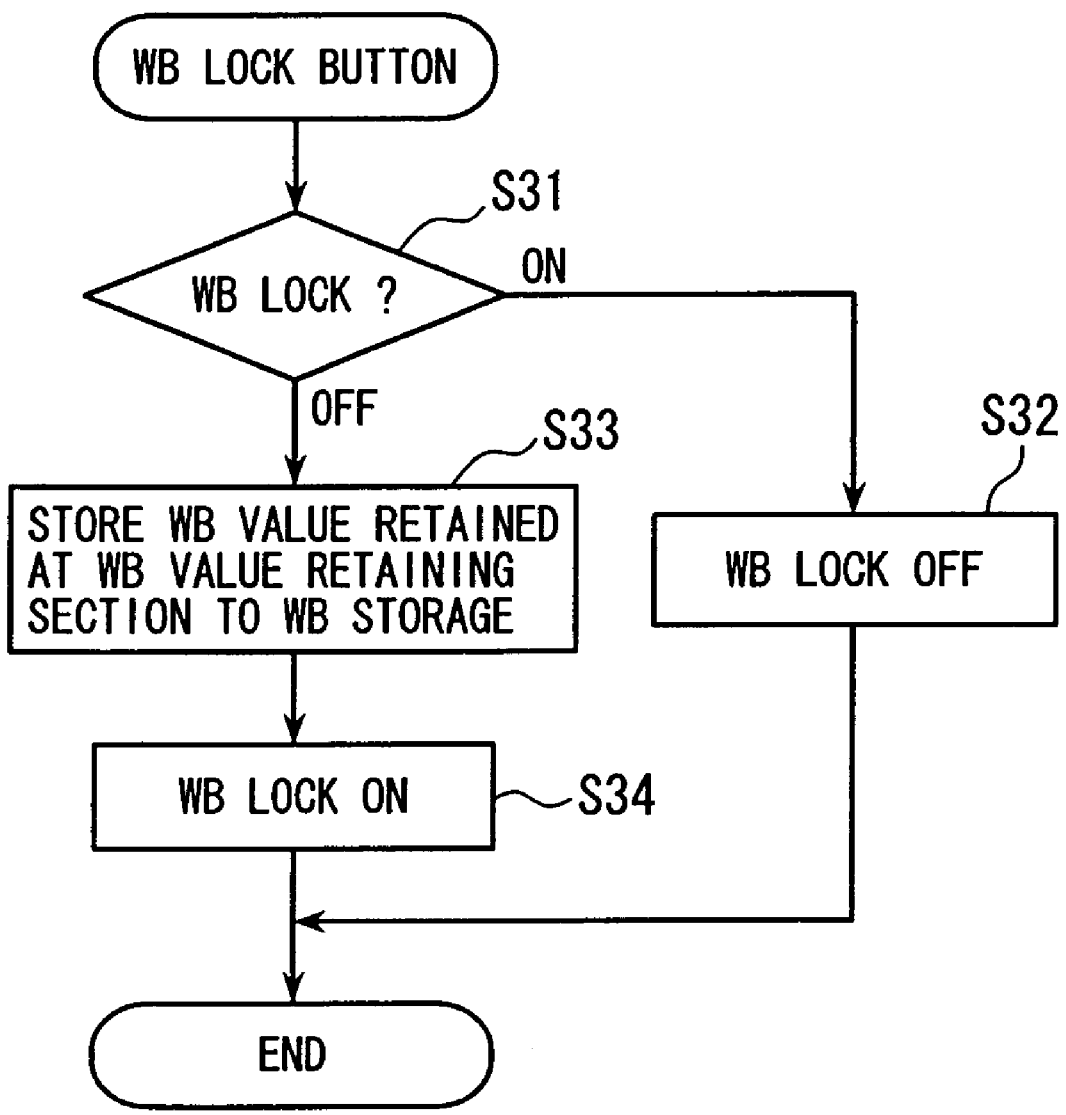
FIG. 6 is a flowchart for explaining the manner of manipulating a white balance lock button in the second embodiment.

FIG. 6 is a flowchart showing the manner of operation in the case where the white balance lock manipulation is effected by using a specialized white balance lock button. The manner of such operation will be briefly described. When the white balance lock button has been manipulated, if in a locked condition of white balance at that time at step S31 for determining whether a white balance lock is effected or not, the white balance lock is unlocked (step S32). If it is not in a locked condition of white balance at that point in time, on the other hand, the white balance value retained at the white balance value retaining section 10 is first stored to the white balance value storage section 11 (step S33) and a locked condition of white balance is then effected (step S34).

It should be noted that, since the white balance value storage section in this embodiment suffices to effect a temporary storage, it can be formed of a general-purpose RAM. Further, the white balance lock is so constructed that it is automatically unlocked when the image taking mode or white balance mode has been changed.

Figure 7:
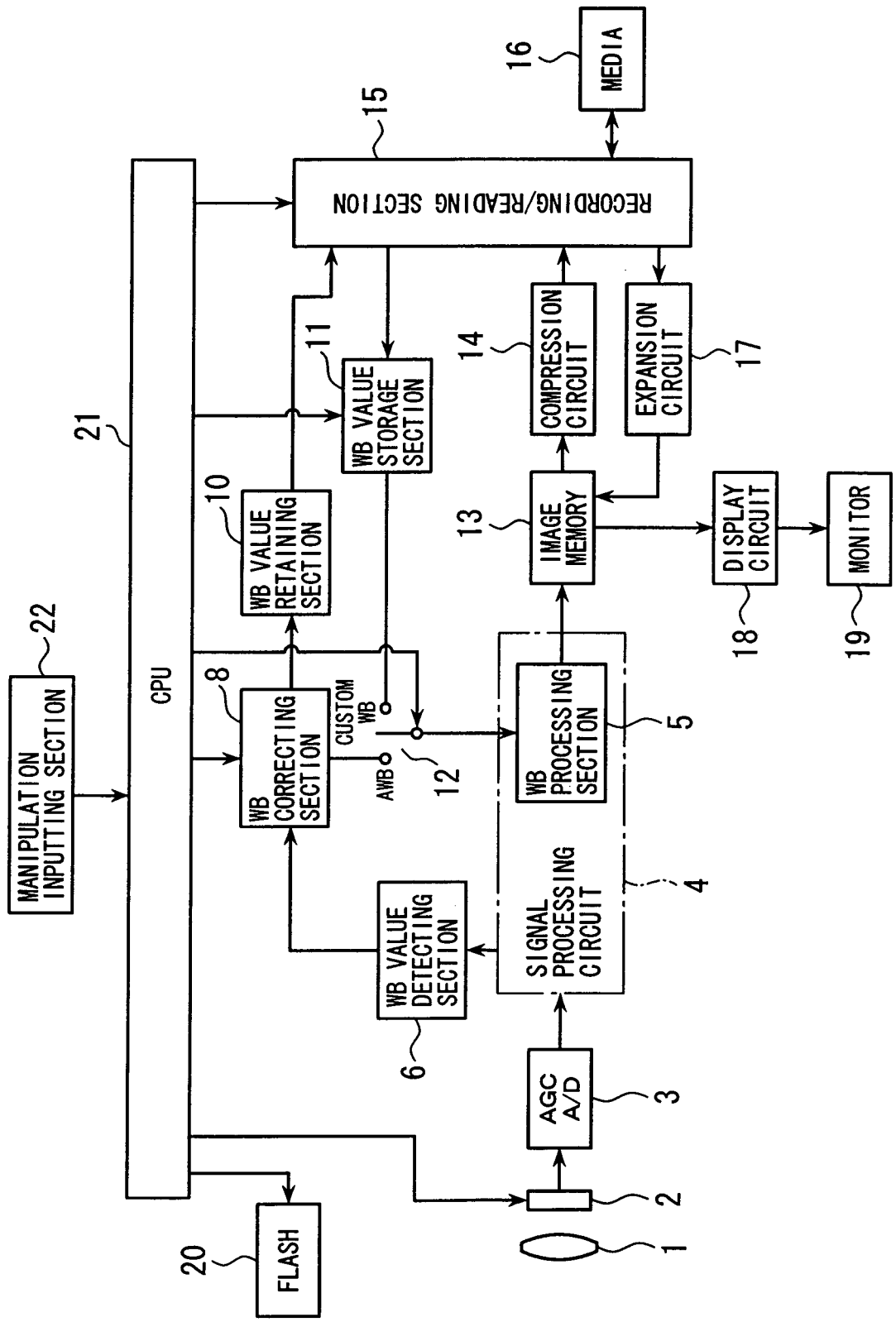
FIG. 7 is a block diagram for schematically showing a digital camera to which a third embodiment of the invention is applied.

A third embodiment of the invention will now be described. FIG. 7 is a block diagram schematically showing a digital camera to which the third embodiment is applied, where like components as in the first embodiment shown in FIG. 1 are denoted by like reference numerals. In those shown in the first and second embodiments, the white balance (AWB) value detected from a taken image at the time of image taking is stored so that it can be used as a custom white balance value. In such case, it is also possible that the white balance value of a reproduced image in the reproducing mode be stored as a custom white balance value. In the present embodiment, at the same time of being capable of white balance processing in AWB mode, the manner as described above can be executed.

In particular, as shown in FIG. 7, the white balance value corrected after its detection from taken image and retained at the white balance value retaining section 10 is to be recorded to an image information region of media 16 through the recording/reading section 15. At the time of reproduction, then, image data is read out from the media 16 and at the same time the white balance value is read out from the image information region so that it can be stored to the white balance value storage section 11 as a custom white balance value.

Figure 8:
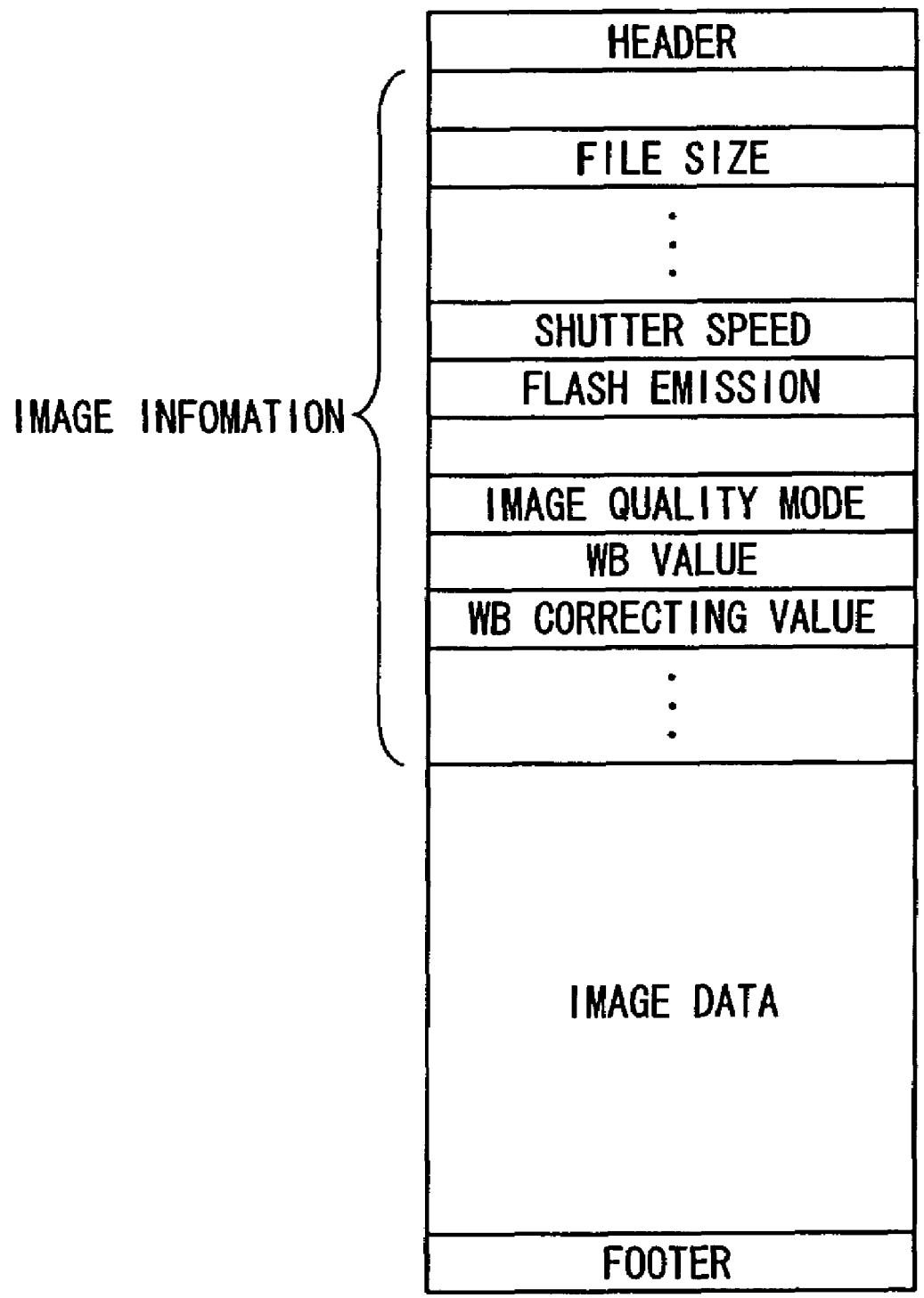
FIG. 8 shows a file structure (layout) of media in the third embodiment.

The operation of the third embodiment having such construction will now be described. The white balance value detected from taken image at the white balance value detecting section 6 is retained at the white balance value retaining section 10 together with the white balance correcting value set by the photographer at the white balance correcting section 8. The taken image is then processed of white balance at the white balance processing section 5 by using the white balance value corrected at the white balance correcting section 8 and, after compression processing, is recorded to the media 16 through the recording/reading section 15. At the same time of the recording of the taken image (image data), as shown by the file structure of media 16 of FIG. 8, the detected white balance value and white balance correcting value retained at the white balance value retaining section 10 are recorded to the image information region (EXIF (registered trademark), Tag information region).

The photographer then selects an image of one's choice at the time of reproduction and causes the detected white balance value and white balance correcting value recorded at the time of the image taking to be read out from the image information region of the selected reproduction image and be stored to the white balance value storage section 11 by a manipulation input from the manipulation inputting section 22. By setting to the custom white balance mode in taking a new image afresh, then, white balance processing can be effected by using the white balance value and white balance correcting value stored at the white balance value storage section 11. It is thereby possible to obtain a taken image which is processed of white balance at a white balance value of one's choice in previously recorded taken image.

A fourth embodiment of the invention will now be described. The fundamental construction of a digital camera to which this embodiment is applied is also similar to that of the first embodiment shown in FIG. 1 and a diagrammatic explanation thereof will be omitted. In this embodiment, white balance values are inputted and stored as custom white balance value to the white balance value storage section 11 from an external personal computer (PC) 24 by a communication means through I/F 23 and CPU 21. In the custom white balance mode, the photographer can effect white balance processing by using the stored white balance values as the above.

Particularly, in this embodiment, a white balance value for special light source previously provided on the personal computer is fetched into the white balance value storage section through a communication means as an optimal white balance values for the case of taking an image by the special light source such as the reddish glow after sunset, and it is stored as a custom white balance value. It is thereby possible to effect a suitable white balance processing at the time of taking an image by special light source.

A fifth embodiment of the invention will now be described. The fundamental construction of a digital camera to which this embodiment is applied is also similar to that of the first or third embodiment shown in FIG. 1 or FIG. 7 and a diagrammatic explanation thereof will be omitted. This embodiment is constructed such that, since a flash emission causes the light source to be changed so that a white balance value without change cannot be used, a suitable white balance processing is effected corresponding to the presence/absence of flash emission. In essence, if a white balance value detected from an image taken by flash emission is stored, it can be used only for those images taken at the time of flash emission. If a white balance value detected from an image taken without flash emission is stored, use of the stored white balance value is prohibited when an image is to be taken by flash emission and a white balance value of detected value or a special white balance value for flash emission is used.

Figure 9:
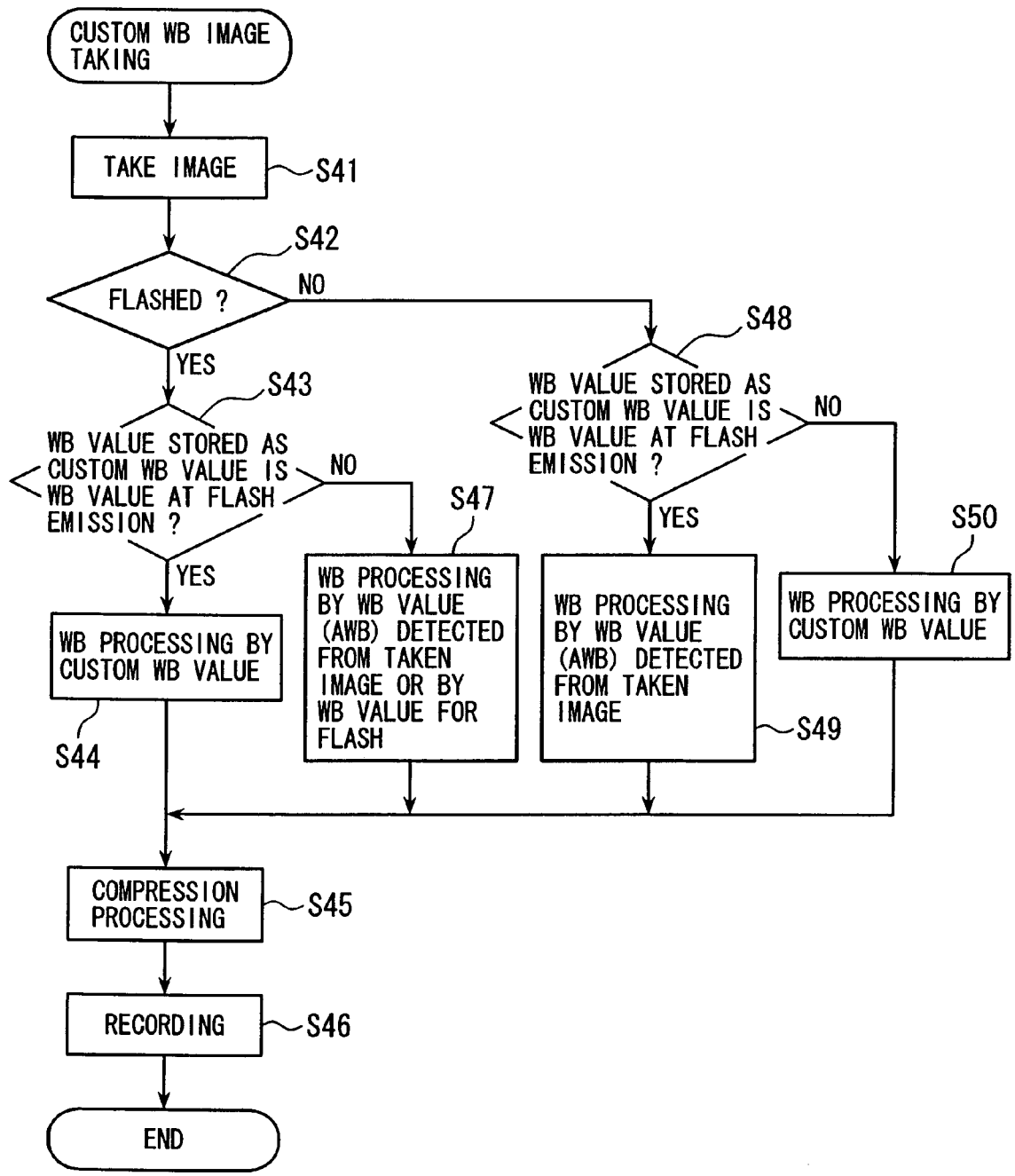
FIG. 9 is flowchart for explaining operation of a fifth embodiment of the invention.

The operation of this embodiment will now be described by way of the flowchart of FIG. 9. When an image is taken in the custom white balance mode, it is determined whether a flash emission is effected in the image taking or not (steps S41, S42). If accompanied by flash emission, it is determined whether the white balance value stored as the custom white balance value is a white balance value at the time of flash emission or not (step S43). If YES at the determining step S43, the white balance processing is effected by such custom white balance value (step S44), and the compression processing and recording are effected (steps S45, S46). If NO at the above determining step S43, on the other hand, white balance processing is effected by a white balance value (AWB) detected from the taken image or by a separately provided, special white balance value for flash emission (step S47), and the compression processing and recording are effected.

Further, if the image taking is not accompanied by flash emission at the step S42 for determining whether flash emission is effected at the image taking or not, it is then determined whether the white balance value stored as custom white balance value is a white balance value at the time of flash emission or not (step S48). If YES at the determining step S48, white balance processing is effected by a white balance value (AWB) detected from the taken image (step S49), and the compression processing and recording are effected.

On the other hand, if NO at the above determining step S48, the white balance value stored as custom white balance value is used to effect white balance processing (step S50), and the compression processing and recording are effected.

By the above processing steps, it is possible to effect a suitable white balance processing corresponding to presence/absence of flash emission in taking the image.

Figure 10:
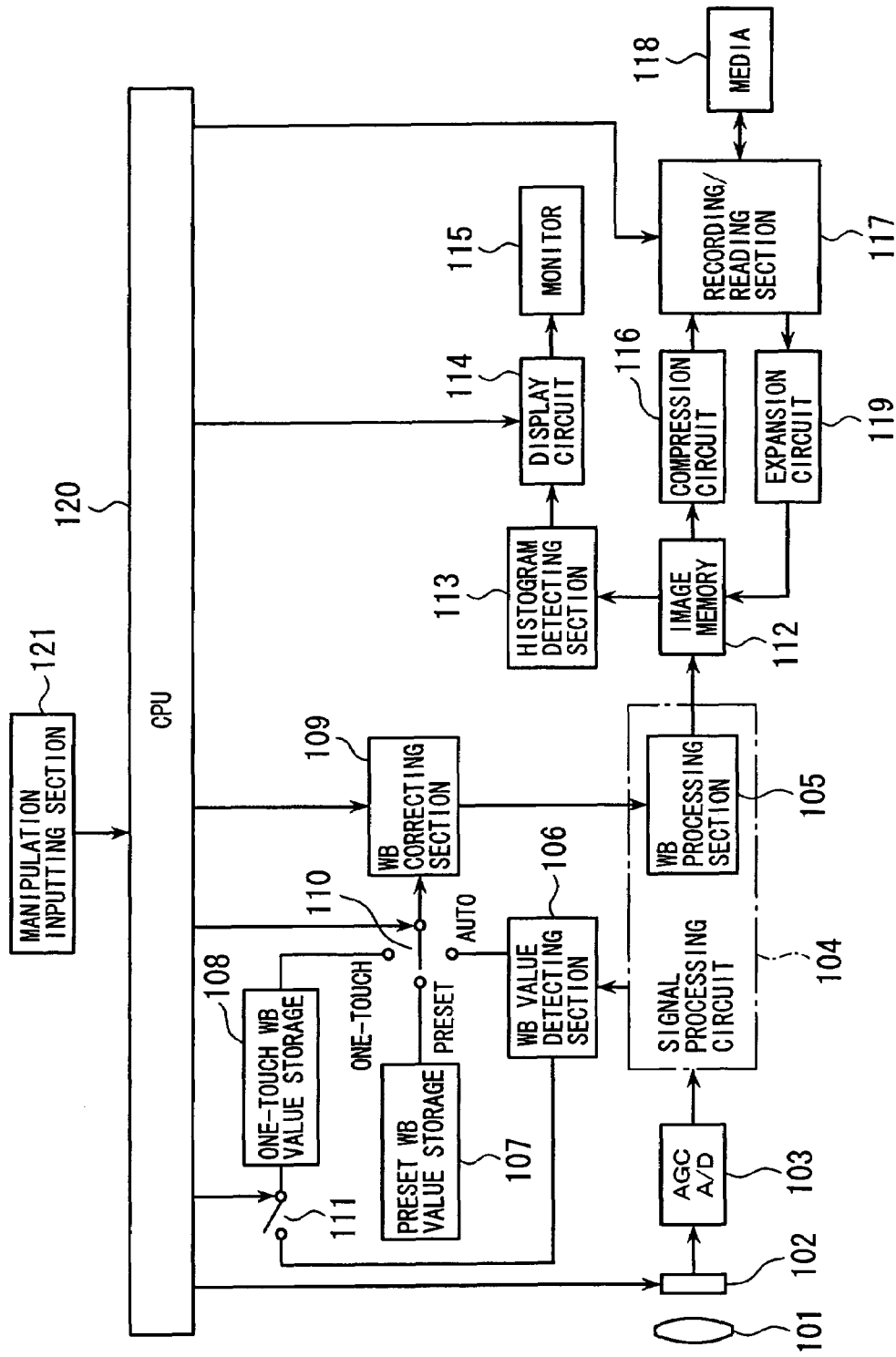
FIG. 10 is a block diagram schematically showing a digital camera to which a sixth embodiment of the invention is applied.

A sixth embodiment of the invention will now be described. FIG. 10 is a block diagram schematically showing a digital camera to which the sixth embodiment is applied. Here a description will be given with including those portions in common with the first and third embodiments shown in FIGS. 1 and 7. FIG. 10 includes: 101, a lens for forming an object image; 102, an imaging device such as CCD for converting incoming object light image into electrical signals; 103, AGC A/D conversion circuit for controlling gain of and effecting analog-to-digital conversion of image pickup signals from the imaging device 102; 104, a signal processing circuit including a white balance processing section 105; 106, a white balance value detecting section for detecting white balance values from taken image data: 107, a preset white balance value storage section formed of a nonvolatile memory such as flash memory or EEPROM, for storing preset white balance values previously set at the time of shipping from factory; and 108, a one-touch white balance value storage section formed of RAM which stores one-touch white balance value acquired by the one-touch white balance value setting processing to be described later.

It further includes: 109, a white balance correcting section for correcting an automatic white balance value (AWB value) detected at the white balance value detecting section 106, or a preset white balance value stored at the preset white balance value storage section 107, or a one-touch white balance value stored at the one-touch white balance value storage section 108; 110, a white balance input changeover switch for switching the input to the white balance correcting section 109 among the preset white balance value, the automatic white balance value (AWB value) detected at the white balance processing section and the one-touch white balance value; and 111, a one-touch white balance input switch for controlling ON/OFF of the inputting of one-touch white balance value to the one-touch white balance value storage section 108.

It furthermore includes: 112, an image memory for storing image data processed of white balance at the white balance processing section 105 by the white balance value corrected at the white balance correcting section 109; 113, a histogram detecting section for detecting luminance distribution histogram by color components of RGB by using image data read out from the image memory 112; 114, a display circuit for displaying on a monitor 115 image data stored at the image memory 112 and the histogram by the color components of RGB detected at the histogram detecting section 113; 116, a compression circuit for compressing image data read out from the image memory 112; 117, a recording/reading section for recording compressed image data to media 118 for example of a memory card and reading image data from the media 118; and 119, an expanding circuit for expanding the image data read out from the media 118.

Denoted by numeral 120 is CPU for controlling the respective component sections and 121 is a manipulation inputting section for effecting various inputs to CPU 120. Those which can be effected from the manipulation inputting section 121 for example includes: the switching of automatic, preset and one-touch white balance modes; and instruction for selection in the respective processing operation menus of the setting of white balance value, white balance correction, setting of one-touch white balance value, etc.

Figure 11:
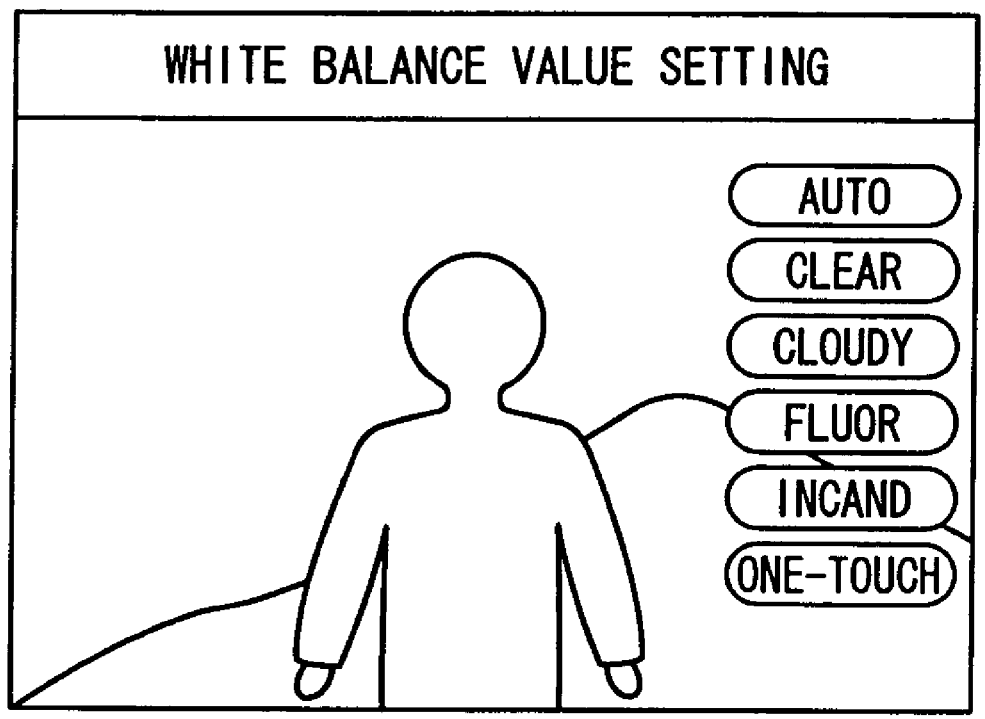
FIG. 11 illustrates the conventional white balance processing technique shown for comparison in explaining the basic techniques of the white balance processing in the sixth embodiment shown in FIG. 10.

A description will now be given with respect to the white balance processing operation in a digital camera to which the sixth embodiment having such construction is applied. First, a fundamental operation of the white balance processing in this embodiment will be described in contrast to the conventional white balance processing. In the conventional setting of white balance values, as shown in FIG. 11, at the same time of displaying a through image on the monitor, a white balance mode menu such as "automatic", "clear sky", "cloudy sky", "fluorescent lamp", "incandescent lamp", and "one-touch" is displayed on the screen displaying the through image. The user, while observing the through image on the monitor, selects and sets a white balance mode appearing to be suitable from the white balance mode menu.

In this conventional setting system, since judgment is to be made while observing the through image, a small screen on the monitor is hard to be seen and it is difficult to make the judgment. There are also disadvantages for example that, when located outdoors, the display screen is hard to be seen due to reflection on the monitor surface, and that, since the monitor itself is colored, a shift from actual color occurs.

In setting a white balance mode in the present embodiment, by contrast, at the same time of displaying the through image on the monitor, histograms (luminance distribution) by the respective color components of RGB of the through image are prepared and displayed on the monitor screen. The user, while watching the histogram display, is then allowed to set an optimum white balance value by objectively judging the respective color distributions of the colors of RGB. It is thereby possible to eliminate the disadvantages in the conventional white balance setting.

Figure 12A:
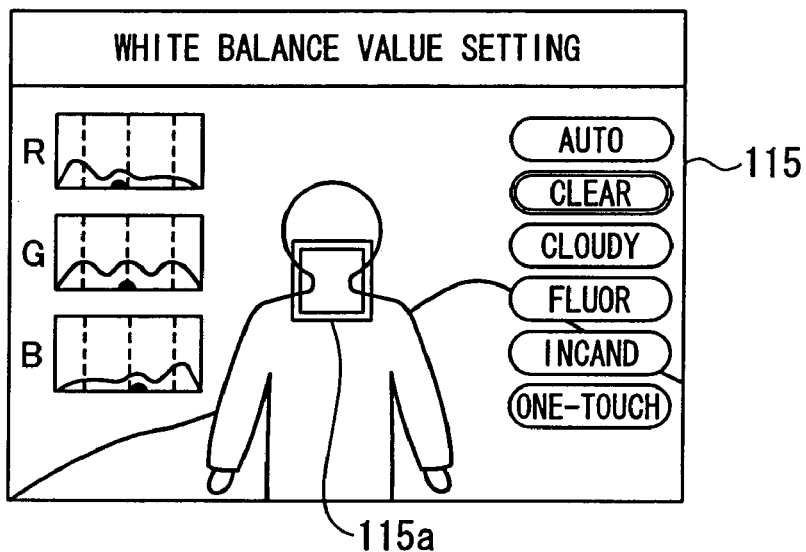
FIGS. 12A, 12B and 12C illustrate basic techniques of white balance processing in the sixth embodiment shown in FIG. 10.

In particular, as shown in FIG. 12A, the histograms by color components of RGB acquired from the entire through image are displayed on the through image which is displayed on the monitor 115. Further, the luminance distribution (histogram) of each of the colors of RGB at a histogram target region 115a as indicated by double rectangular mark at the center of the screen frame of the through image is computed and is displayed as a black region on the histogram of the entire screen. FIG. 12A shows histograms of the entire screen and luminance distributions of the histogram target region 115a when "clear sky" is selected as the white balance mode. In this case, the peak of the luminance distribution of R of the target region 115a is shifted toward the lower side and the peak of the luminance distribution of B is shifted toward the higher side. From this, it can be objectively judged that the color tone at the target region 115a of the through image is bluish. Accordingly, if the color of the object in the histogram target region 115a is white, it is seen that an unsuitable white balance value at a color temperature lower than actual color temperature is being set.

Figure 12B:
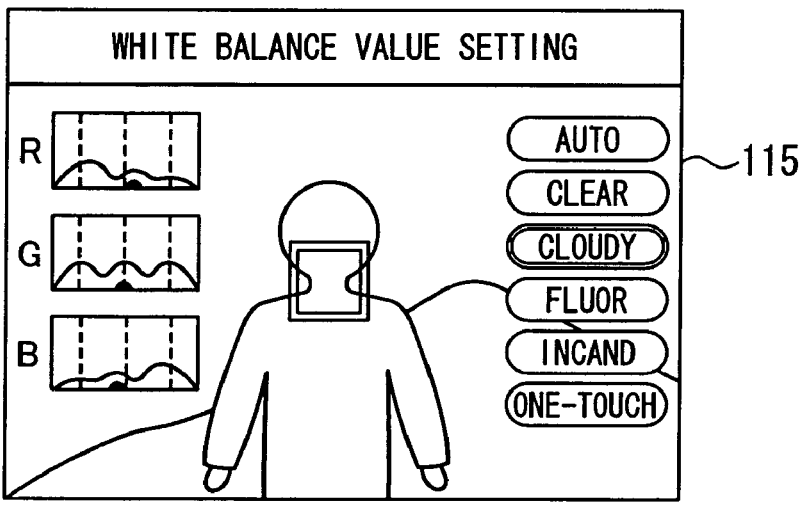

FIG. 12B, on the other hand, shows the histograms of the entire screen and the luminance distributions of the histogram target when "cloudy sky" is selected as the white balance mode. In this case, the peak of the luminance distribution of R of the target region is shifted toward the higher side and the peak of the luminance distribution of B is shifted toward the lower side. From this, it can be objectively judged that the color tone at the target region 115a of the through image is reddish. Accordingly, if the color of the object in the histogram target region 115a is white, it is seen that an unsuitable white balance value at a color temperature higher than actual color temperature is being set.

Figure 12C:
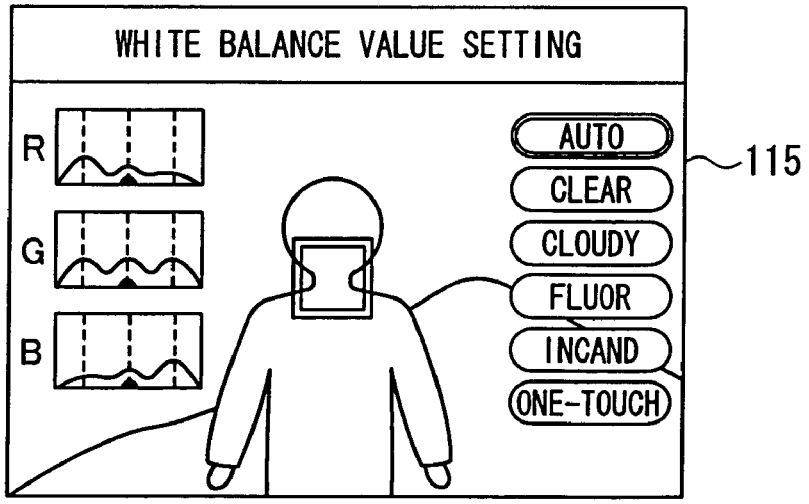

By contrast, FIG. 12C shows the histograms of the entire screen and the luminance distributions of the histogram target region when "automatic" is selected as the white balance mode. In this case, the peak of the luminance distribution of each color of the target region is concentrated to the same position. From this, it can be objectively checked that a setting of suitable white balance value is effected. This case has been shown as one in which a proper white balance value is set when "automatic" is selected as the white balance mode. If, however, the peak of luminance distribution of each color in the target region with respect to a white object is concentrated to the same position as shown in FIG. 12C when another white balance mode such as "fluorescent lamp" is selected, the white balance mode, "fluorescent lamp", selected and set at that time becomes a proper white balance mode.

Figure 13:
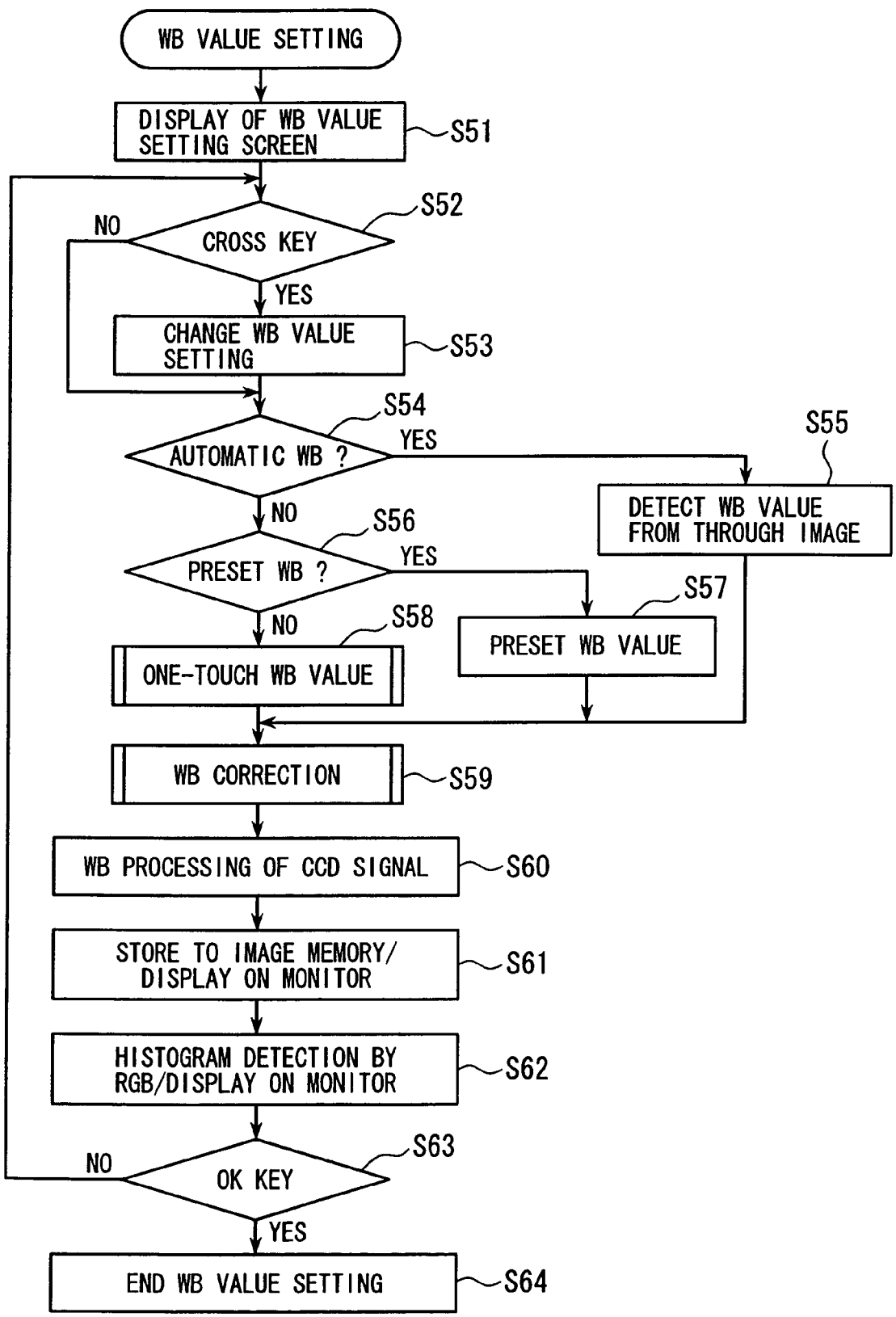
FIG. 13 is a flowchart for explaining setting operation of white balance value in the sixth embodiment shown in FIG. 10.
Figure 14:
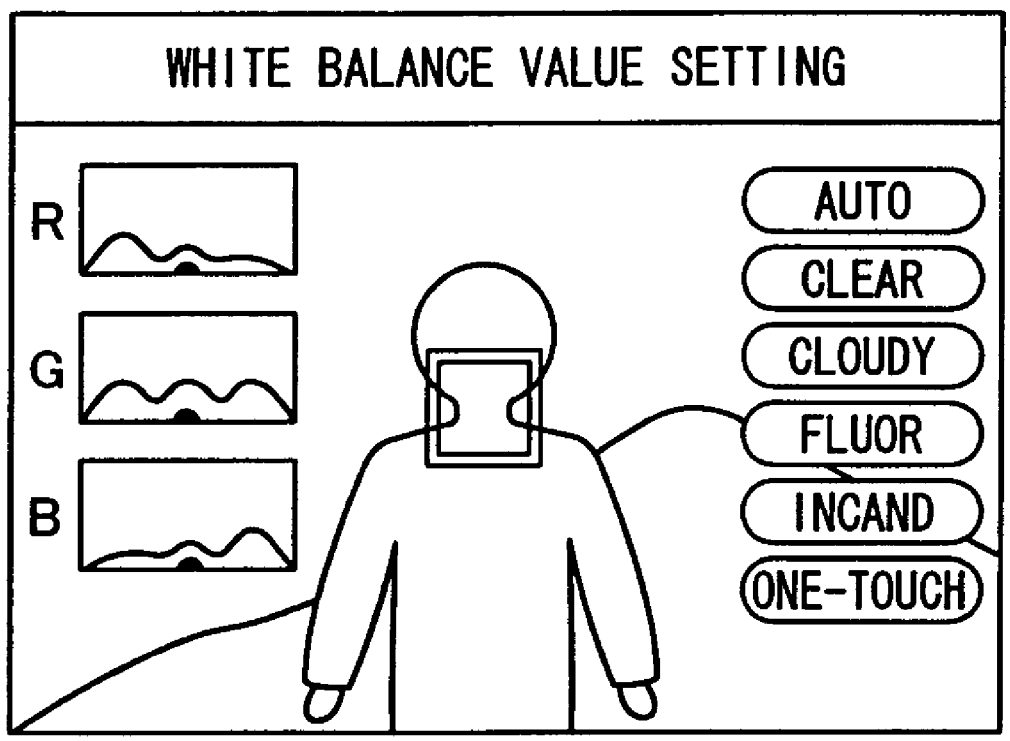
FIG. 14 illustrates the operation of the flowchart shown in FIG. 13.

The white balance processing operation in the sixth embodiment will now be described. The white balance processing operations that can be effected by the user in this embodiment are generally divided into three categories of operations, i.e., the white balance value setting operation, the white balance value correcting operation, and the one-touch white balance value setting operation. First, the white balance value setting operation will be described by way of the flowchart shown in FIG. 13. When an instruction for setting white balance value is given by the manipulation inputting section 121 to effect the white balance value setting operation and a menu therefor is opened, a white balance value setting screen is first displayed on the monitor 115 (step S51). In this case, as shown in FIG. 14, a through image is displayed on the monitor 115; the white balance mode menu is displayed on the right side of the screen; and the respective histograms of the colors of RGB of the entire screen and the histogram target region of the through image detected at the histogram detecting section 113 are displayed on the left side of the screen.

A cross key manipulation by the user is then accepted (step S52). While the cross key is being manipulated, the user selects and sets the white balance mode in the order of "automatic" WB, "clear sky", "cloudy sky", "fluorescent lamp", "incandescent lamp", and "one-touch" (step S53). It should be noted that, if the cross key is not manipulated at step S52 for determining the cross key, the processing proceeds to step S54 for selecting and determining the automatic white balance to be described next, since the automatic white balance mode is set as a default.

If the automatic white balance is selected as the white balance mode (step S54), a white balance value detected at the white balance value detecting section 106 from the through image is outputted (step S55). If a preset white balance mode of "clear sky", "cloudy sky", "fluorescent lamp", or "incandescent lamp" other than the automatic white balance is selected and set (step S56), a preset white balance value adjusted and stored at the preset white balance value storage section 107 at the time of shipping from factory is read out (step S57). If the one-touch white balance mode is selected and set, readout is obtained of the one-touch white balance value which has previously been acquired by the user through the one-touch white balance value setting operation and caused to be stored to the one-touch white balance value storage section 108 (step S58).

One of the above described automatic white balance value, preset white balance value, and one-touch white balance value selected by the setting of the respective white balance modes is inputted to the white balance correcting section 109 to effect a fine adjustment (to be described later in detail) where the white balance value selected and set as described above is corrected (step S59). The corrected white balance value is then used to render white balance processing at the white balance processing section 105 on the taken image data obtained from CCD imaging device 102 (step S60).

The image data processed of white balance is then stored to the image memory 112, and the stored image data is read out and displayed on the monitor 115 as a taken image (step S61). At the same time, histogram detection by color components of RGB of the entire screen and the histogram target region is effected at the histogram detecting section 113 with respect to the image data stored at the image memory 112. The obtained histograms by color components of RGB are then concurrently displayed on the taken image which is being displayed on the monitor 115 (step S62).

The above operation steps are repeated until the pressing of OK key on the menu screen by the user (step S63). When selection and setting of an optimum white balance value are confirmed based on the histograms displayed on the monitor 115, the OK key is pressed to end the setting operations of white balance value. The displaying of the white balance mode menu and the histograms on the monitor 115 is then eliminated to restore a normal through image display (step S64).

In the setting operation of white balance value, the white balance conditions can be specifically grasped in this manner while referring to the histograms by color components of RGB displayed on the white balance value setting screen. It is thereby possible to set an accurate white balance value.

Figure 15:
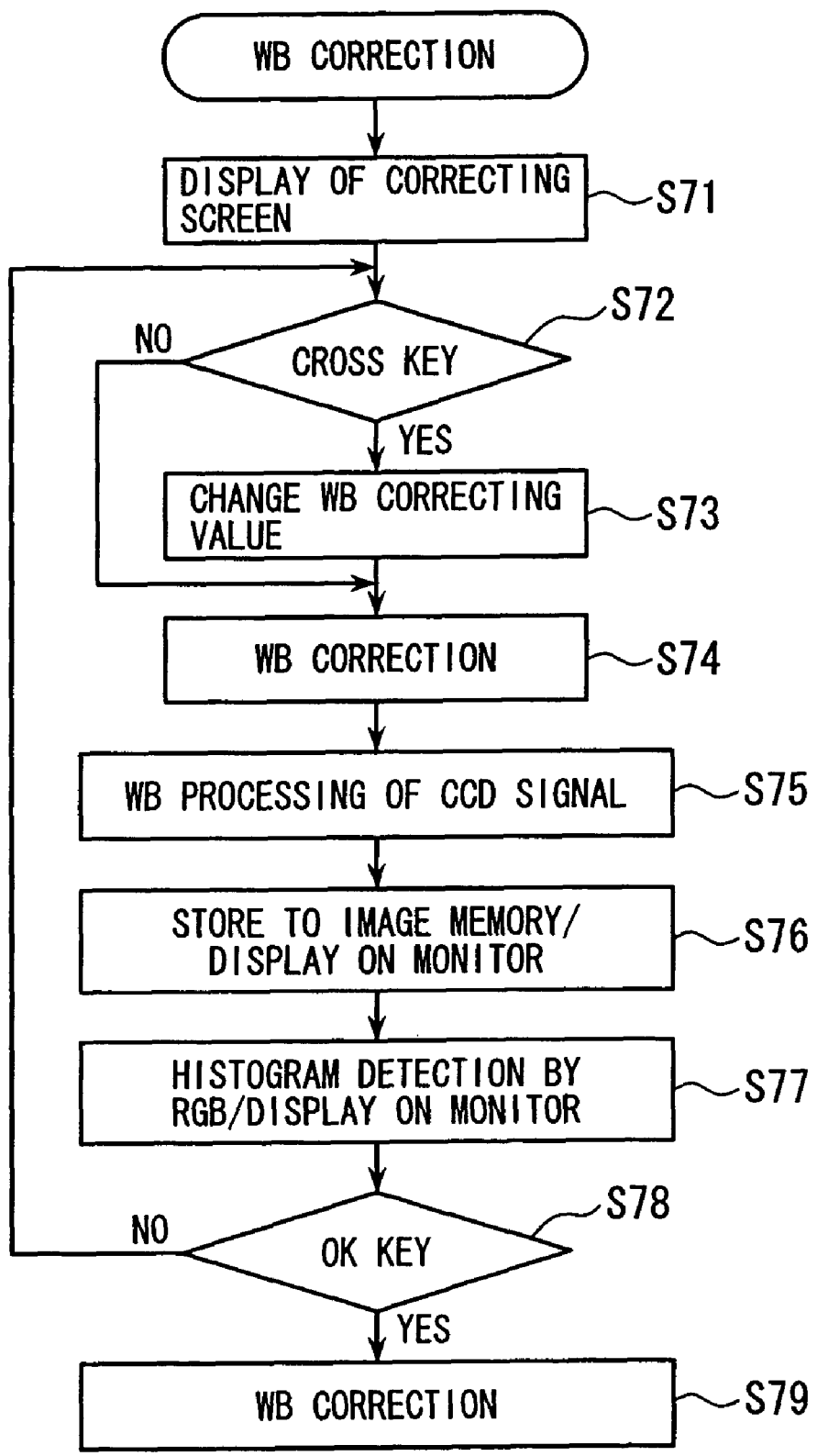
FIG. 15 is a flowchart for explaining setting operation of white balance correcting value in the sixth embodiment shown in FIG. 10.
Figure 16:
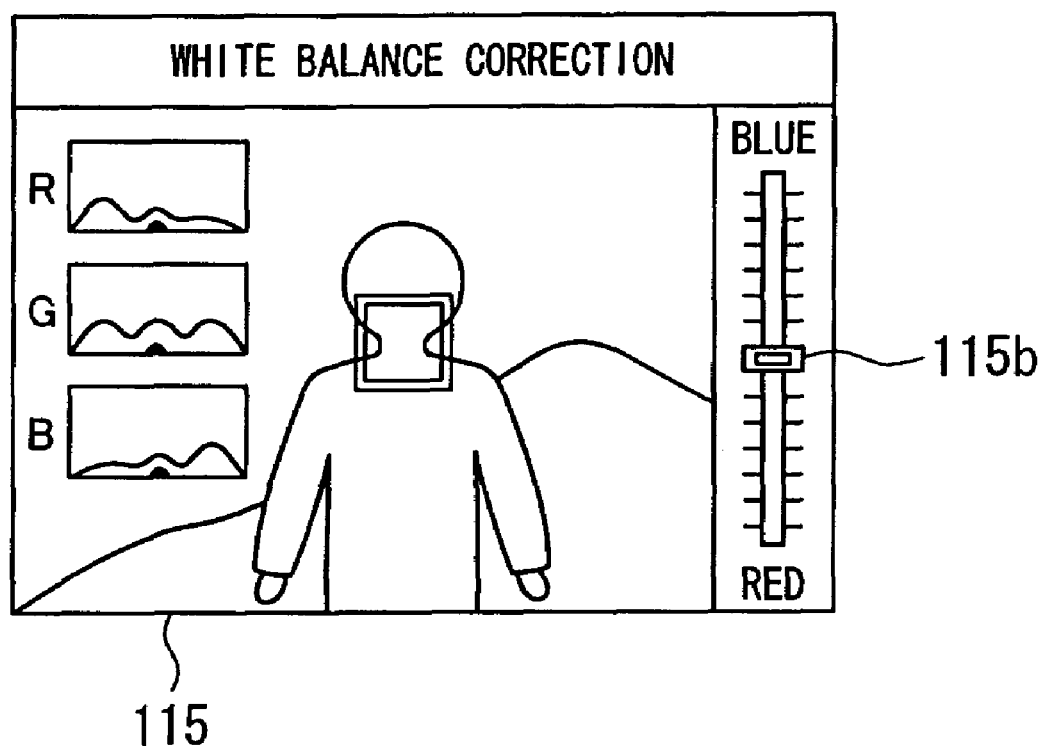
FIG. 16 illustrates the operation of the flowchart shown in FIG. 15.

The white balance correcting operation to be effected at the white balance correcting section 109 in this embodiment will now be described by way of the flowchart of FIG. 15. When the white balance correcting operation is designated by the user from the manipulation inputting section 121 and a menu therefor is opened to effect a fine adjustment of the white balance value, a white balance correcting screen is displayed on the monitor 115 (step S71). In this case, as shown in FIG. 16, a through image processed of white balance by the white balance value selected and set by the previously described white balance value setting operation shown in FIG. 13 is displayed. A white balance correcting menu consisting of a gain adjusting knob 115b which can be moved in the range of blue to red is then displayed on the right side of the screen, and the histograms by color components of RGB of the entire screen and histogram target region of the through image detected at the histogram detecting section 113 are displayed on the left side of the screen.

In accordance with a cross key manipulation by the user (step S72), change and adjustment of the white balance correcting value are then effected (step S73). The user effects such change and adjustment of the white balance correcting value by manipulating the gain adjusting knob 115b in an up and down direction while referring to the histograms by color components of RGB on the monitor display screen so as to adjust the gains of blue and red. In particular, when bluish tone is to be intensified, a correcting value for emphasizing the bluish tone is set by causing the gain adjusting knob 115b to be slid up toward the blue side so as to up the blue gain and down the red gain. On the other hand, when reddish tone is to be emphasized, a correcting value for emphasizing the reddish tone is set by causing the gain adjusting knob 115b to be slid down toward the red side so as to down the blue gain and up the red gain.

The white balance value (automatic, preset, one-touch white balance values) selected and set by the white balance value setting operation as preciously shown in FIG. 13 is then corrected at the white balance correcting section 109 by using the white balance correcting value thus set by the user (step S74). It should be noted that, if the cross key is not manipulated at the cross key determining step S72, the processing proceeds to the above described white balance correction step S74.

In the operations thereafter, the white balance correcting value obtained as described above is first used similarly to the white balance value setting operation as previously shown in FIG. 13 to render white balance processing at the white balance processing section 105 with respect to the taken image data obtained from CCD imaging device 102 (step S75). The image data processed of white balance is then stored to the image memory 112, and the stored image data is read out and displayed on the monitor 115 as a taken image (step S76). At the same time, histogram detection by the color components of RGB of the entire screen and histogram target region is performed at the histogram detecting section 113 with respect to the image data stored at the image memory 112. The obtained histograms by color components of RGB are then concurrently displayed on the taken image which is being displayed on the monitor 115 (step S77).

The above operation steps are repeated until the OK key is pressed on the menu screen by the user (step S78). When the setting of an optimum white balance correcting value is confirmed while looking at the histograms displayed on the monitor, the OK key is pressed to end the white balance value correcting operation (step S79).

In this manner, also in the setting operation of white balance correcting value, the white balance correcting menu (gain adjusting knob) is adjusted and set while referring to the histograms by color components of RGB that are displayed on the white balance correcting value setting screen. It is thereby possible to set an accurate white balance correcting value with making an objective judgment based on the histogram display.

Figure 17:
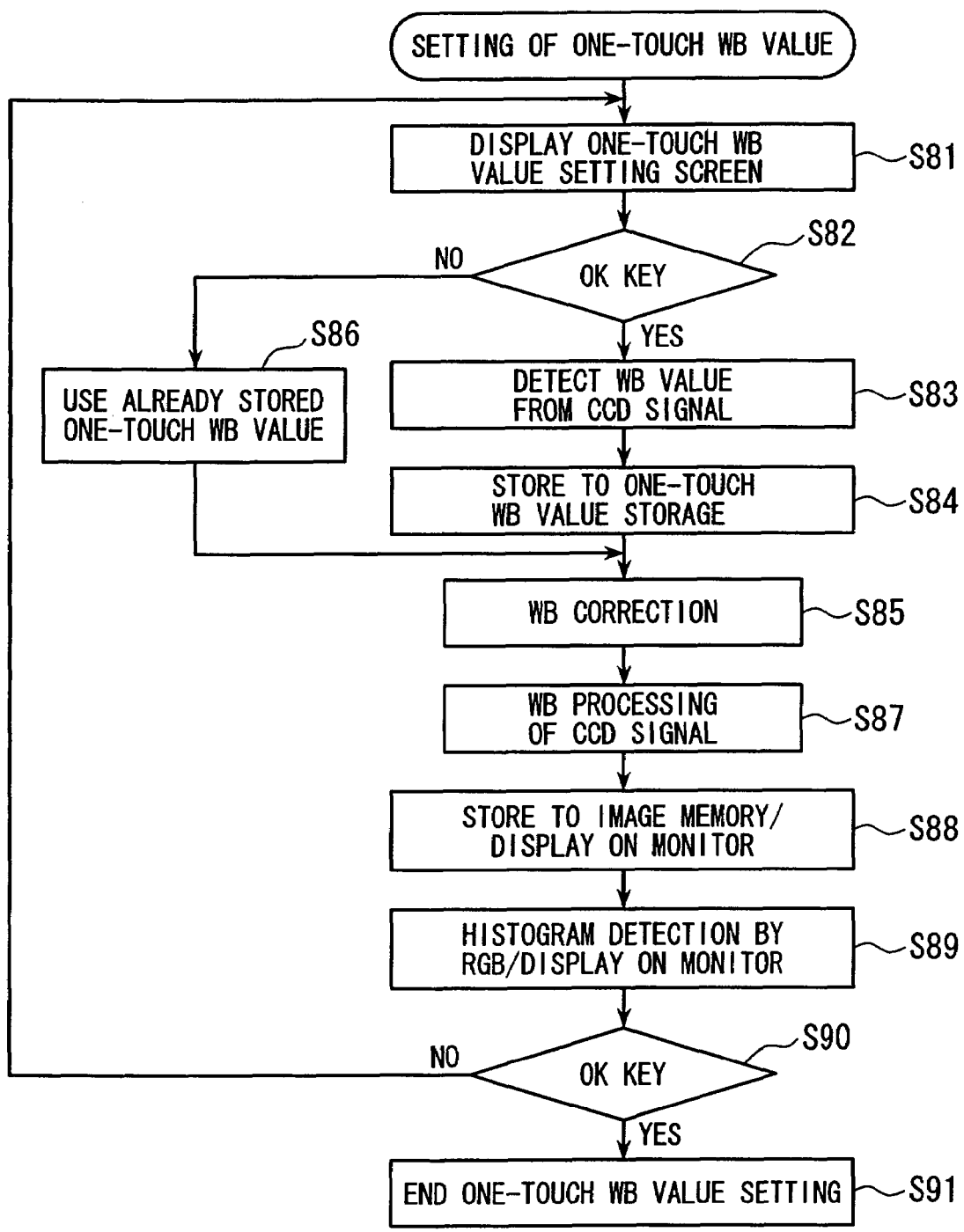
FIG. 17 is a flowchart for explaining setting operation of the one-touch white balance value in the six embodiment shown in FIG. 10.

The setting operation of one-touch white balance value will now be described by way of the flowchart of FIG. 17. An automatic white balance value or preset white balance value is the value automatically measured by the camera or adjusted and set at the time of the shipping of the camera from factory. In deriving the one-touch white balance value, by contrast, the user adjusts and sets the white balance value by taking an image of white object such as a piece of paper so as to render the taken image on the monitor display white by using the light source at the location of photography.

Figure 18:
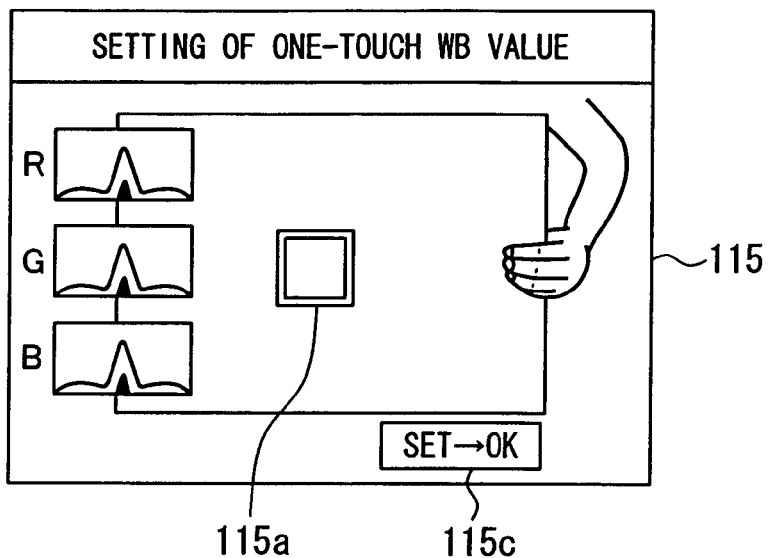
FIG. 18 illustrates the operation of the flowchart shown in FIG. 17.

In particular, when the user designates the processing operation for setting one-touch white balance value and opens the setting menu in order to set the one-touch white balance value, a one-touch white balance value setting screen is displayed on the monitor 115 (step S81). In this case, as shown in FIG. 18, a through image obtained by taking an image of the white paper is displayed on the monitor 115. The histograms by color components of RGB of the entire through image frame and histogram target region 115a are displayed on the left side of the screen, and one-touch setting menu 115c, "SET→OK", is displayed on the lower-right side of the screen.

If OK key is then pressed (step S82), the processing enters a setting operation of new one-touch white balance value so that a white balance value by which the taken image screen taking an image of the white paper displayed on the monitor 115 is rendered white is detected at the white balance detecting section 106 based on CCD image pickup signals (step S83). The detected white balance value is stored to the one-touch white balance value storage section 108 as the one-touch white balance value of the occasion (step S84). The one-touch white balance value stored at the one-touch white balance value storage section 108 is then read out to set a white balance correcting value at the white balance correcting section 109 by using the correcting value (gain value) set by the user (step S85).

If OK key is not pressed at the above described step S82 for determining the OK key, a previously stored one-touch white balance value is used (step S86), and a correction is made on the previously stored one-touch white balance value similarly by using a correcting value set by the user at the white balance correcting section 109. The one-touch white balance correcting value obtained as described is then used to effect white balance processing at the white balance processing section 105 on the taken image data obtained from CCD imaging device 102 (step S87). The image data processed of white balance is stored to the image memory 112, and the stored image data is read out to be displayed on the monitor 115 as a taken image (step S88). At the same time, histogram detection by the color components of RGB of the entire screen and histogram target region is effected at the histogram detecting section 113 with respect to the image data stored at the image memory 112. The obtained histograms by color components of RGB are concurrently displayed on the taken image which is displayed on the monitor 115 (step S89).

The above operation steps are repeated until an END key (the left side of a cross key for example) is pressed (step S90). When the setting of an optimum one-touch white balance value is confirmed based on the histograms displayed on the monitor 115, the END key is pressed to end the setting operation of one-touch white balance value (step S91). In this manner, also in the setting of one-touch white balance value, its suitability can be objectively checked while similarly referring to the histograms by color components of RGB when setting the white balance value so that the taken image frame of white paper displayed on the one-touch white balance value setting screen is rendered white.

Figure 19:
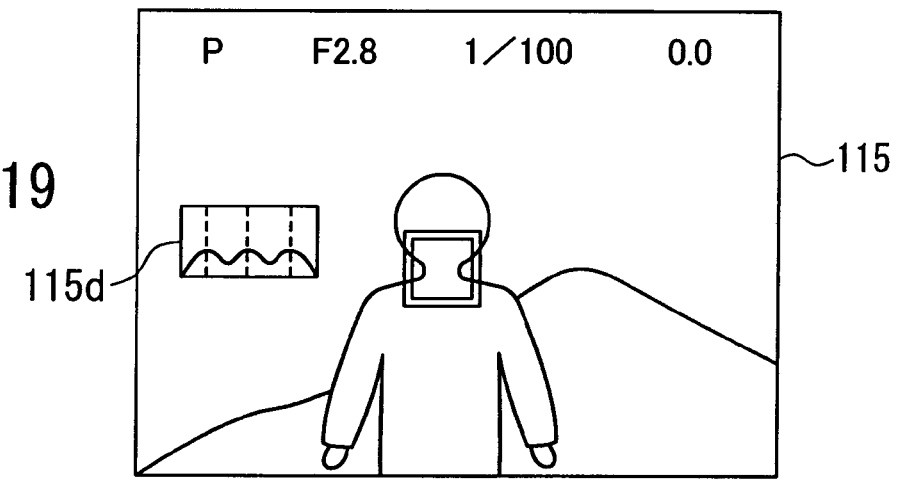
FIG. 19 illustrates the manner of using a histogram display in adjusting exposure.

In the above description of operations according to the sixth embodiment, a technique has been described of obtaining a suitable white balance value or white balance correcting value by using the histogram display by color components of RGB in the setting of a white balance value, setting of a white balance correcting value or setting of one-touch white balance value. The displaying of histogram, however, can also be used in taking an image in an ordinary manner. In the case of such ordinary image taking, the histograms by color components of RGB are not required, and it suffices as shown in FIG. 19 to display a histogram 115d of luminance distribution. Such luminance distribution histogram can be used in adjusting exposure.

In the above description of the sixth embodiment, the histograms by color components have been shown as those detecting and displaying the histograms by the color components of three-primary colors of RGB. The histograms by color components to be displayed however are not limited to those of three-primary colors of RGB. For example, since G component in the three-primary colors has a lower contribution to the setting of white balance value, it can be omitted while detecting and displaying only the histograms (luminance distribution) of R, B components. Further it is also possible to detect and display the histograms of three color components of a complementary-color system of Cy (cyan), Mg (magenta), Ye (yellow). It is furthermore possible to formulate and display a histogram related to the hue components Cb, Cr.

Figure 20:
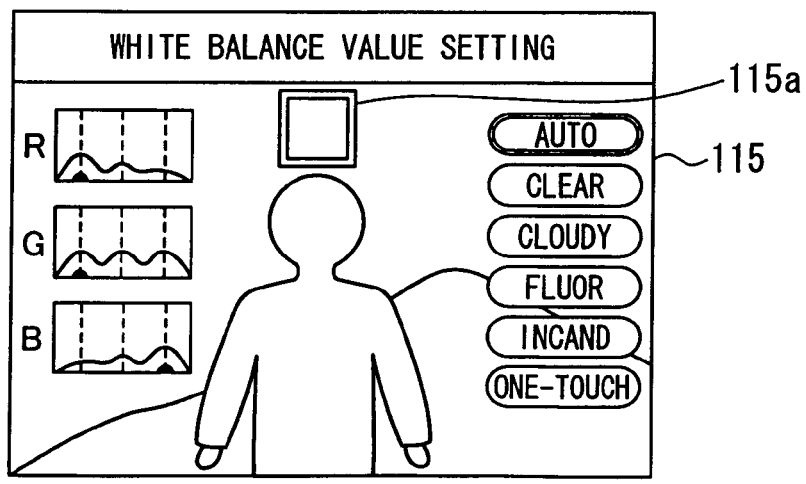
FIG. 20 illustrates the manner where the histogram target region in a histogram display is made movable.

Further, the above sixth embodiment has been shown as that in which the histograms are displayed of the entire screen and of the histogram target region 115a set at the center of the screen of the white balance value setting screen or white balance correcting value setting screen. The histogram target region 115a set as fixed to the center region of the screen, however, can be modified so as to be movable. For example, if the histogram target region 115a is set in the blue sky portion in an upper part of the screen as shown in FIG. 20, the luminance distribution of the histogram target region 115a is such that the luminance of blue is high and red and green are of low luminance whereby the vividness of the blue sky portion can be confirmed. It should be noted that the moving of the histogram target region 115a can be effected for example by concurrently manipulating a histogram target displaying button and a cross key.

In the description of the above embodiments, the respective functions of the embodiments are achieved by operations of the respective sections in accordance with control of CPU. On the other hand, the functions of white balance processing and displaying as explained by the respective flow charts shown in the figures can also be achieved mostly by CPU under programs previously stored to an internally provided nonvolatile memory such as EEPROM (not shown) in the digital camera. In the case where CPU effects a part or whole of the processing of the above described embodiments according to such programs to achieve the above described functions of the respective embodiments by such processing, the programs themselves and the storage medium storing such programs constitute the present invention. It should be noted that such programs can also be supplied to an imaging apparatus such as digital camera as a recording medium or by the means of communication from an external source.

Further, while an example applied to digital camera has been described in the above embodiments, it is naturally also possible to apply the present invention to a camera section for example of mobile phone.

As has been described by way of the above embodiments, it is possible according to the first aspect of the invention to effect white balance processing of a freshly taken image by using white balance value used in the white balance processing of a past taken image so that a taken image having a similar color tone as the past taken image can be readily obtained. According to the second aspect, since the white balance processing of a freshly taken image can be effected by using a white balance value detected and set from a past taken image, i.e., AWB value, a color tone of image taken by AWB in the past can be readily reproduced. According to the third aspect, since, even at the time of AWB processing where the detection value setting means is selected, switching can be forcibly made to the used value setting means during a specific designated period, a white balance value in the white balance processing of a past taken image can be at any time used even in the AWB processing.

According to the fourth aspect, a white balance value used in the white balance processing of taken image displayed on a display means by a preview or rec-view manipulation is stored, it is possible to readily reuse the white balance value of a favorite color tone which has been checked on the display means. According to the fifth aspect, since a corrected preset white balance value used in white balance processing is stored as a white balance value used in the past, it is possible to readily recall the white balance value which has been set in preset white balance processing in the past. According to the sixth aspect, before the storing of a white balance value to be stored to a storage means, it is temporarily retained at a retaining means so that registration of predetermined white balance values to the storage means can be securely and readily effected.

According to the seventh aspect, since a plurality of white balance values are retained at a retaining means and are selectively registered to the storage means, registration of only the desired white balance values to the storage means can be readily effected. According to the eighth aspect, a white balance value used in recorded taken image can be readily reused. According to the ninth aspect, a suitable white balance value can be set corresponding to presence/absence of flash emission on the taken image. According to the tenth and eleventh aspects, it is possible to achieve a digital camera in which white balance processing of taken image can be readily effected in a favorite color tone. According to the twelfth aspect, since white balance processing of a freshly taken image is effected by using a white balance value used in the white balance processing of a past taken image, it is possible to achieve a white balance processing method by which a taken image having a color tone similar to the past taken image can be readily produced. According to the thirteenth aspect, since white balance processing of a freshly taken image is effected by using a white balance value obtained in AWB processing of a past taken image, it is possible to achieve a white balance processing method by which the color tone of taken image by AWB in the past can be readily recalled. According to the fourteenth aspect, the white balance processing according to the thirteenth aspect can be achieved by means of software.

According to the fifteenth aspect of the invention, a histogram processing by color components is effected on taken image processed of white balance and the obtained histograms by color components are displayed on a display means so that the actual condition of white balance can be readily grasped and an accurate white balance value can be readily adjusted and set. According to the sixteenth aspect, since histogram processing by color components is effected separately for the entire screen and for a specific regional portion, a histogram comparison by color components is readily possible of the entire portion and the specific regional portion which serves as a detecting portion. According to the seventeenth aspect, histogram related to the entire screen and histogram related to a specific regional portion are displayed in a manner capable of being compared by color components so that a comparison becomes even more easier of the histogram related to the entire screen and the histogram of the specific regional portion. According to the eighteenth aspect, histogram by color component is concurrently displayed when the screen for setting white balance is displayed, comparison between the white balance setting screen and the histogram by color components becomes easier. According to the nineteenth aspect, since histogram by color components and information related to the adjusting conditions of white balance are concurrently displayed, it is readily possible to effect a comparison between the actual conditions and adjusting conditions of white balance. According to the twentieth aspect, since histogram by color components and information indicating the types of white balance mode that can be selected are concurrently displayed, a white balance mode that can be chosen can be readily selected while looking at the histogram.

According to the twenty-first aspect, since histogram by color components and information related to ratio concerning a specific color component subjected to histogram processing are concurrently displayed, a setting by color components in white balance can be readily effected. According to the twenty-second aspect, histogram by color components and taken image are concurrently displayed so that the taken image and the histogram by color components can be compared to more readily judge for example the suitability of white balance. According to the twenty-third aspect, since a white balance detecting region is displayed on taken image which is displayed together with histogram by color components, it is readily possible to check the white balance detecting region. According to the twenty-fourth aspect, histogram processing is effected and displayed by three color components of RGB which are the most generally used color components, the actual condition of white balance can be even more readily grasped. According to the twenty-fifth aspect, it is possible to achieve a digital camera having an improved white balance performance because it is provided with the white balance processing apparatus constructed as the above. According to the twenty-sixth aspect, it is possible to achieve a white balance processing method by which, since histogram by color components is displayed together with a taken image, the taken image and the histogram by color components can be contrasted to execute white balance processing while readily making a judgment for example as to the suitability of white balance. According to the twenty-seventh aspect, the white balance processing according to the twenty-sixth aspect can be achieved by means of software.

What is claimed is:

1. A white balance processing apparatus comprising:
   white balance processing means for effecting white balance processing on a taken image based on a set white balance value;
   non-volatile storage means for storing white balance values set for the taken image obtained in past image taking and employed in said white balance processing;
   custom value setting means for setting a white balance value employed in the past, stored in the storage means as a custom white balance value for the taken image by a new picture taking;
   detected value setting means for detecting and setting a white balance value to be set to said white balance processing means from the taken image;
   correction means for correcting said detected white balance value; and
   corrected detected value setting means for setting said corrected detected white balance value to said white balance processing means;
   wherein said storage means additionally stores said corrected detected white balance value set and employed at said white balance processing means as a white balance value employed in the past.

2. The white balance processing apparatus according to claim 1 further comprising:
   selection means for selecting one or the other of said custom value setting means and said detected value setting means as means for setting said white balance value for the taken image; and
   forced setting means for, if said detected value setting means is selected by the selection means, switching from said detected value setting means to said custom value setting means only during a specifically designated period.

3. The white balance processing apparatus according to claim 1 further comprising:
   display means for displaying taken images processed of said white balance processing with using said set white balanced value; and
   register means for causing the white balance value employed in the white balance processing of the taken image displayed on said display means to be stored to said storage means based on an instruction from a photographer.

4. The white balance processing apparatus according to claim 1 further comprising:
   preset value storage means for previously storing preset white balance values that are white balance values set correspondingly to specific light sources; and
   corrected preset value setting means for correcting said preset white balance values by said correction means and setting the corrected preset white balance value to said white balance processing means;
   wherein said storage means stores said corrected preset white balance value set and employed at said white balance processing as said white balance value employed in the past.

5. The white balance processing apparatus according to claim 4 further comprising:
   retaining means for retaining a white balance value employed in the white balance processing at said white balance processing means; and
   register means for registering the white balance value retained at the retaining means to said storage means based on an instruction from a photographer.

6. The white balance processing apparatus according to claim 5, wherein said retaining means retains a plurality of white balance values employed in said white balance processing, and wherein said register means selects a predetermined white balance value from said plurality of white balance values and registers it to said storage means based on said instruction from a photographer.

7. A white balance processing apparatus comprising:
   white balance processing means for effecting white balance processing on a taken image based on a set white balance value;
   reproduction means for reading recorded image data for reproduction;
   selection means for selecting desired image data from a reproduced image;
   non-volatile storage means for storing a white balance value corresponding to said selected image data and employed in white balance processing of the image data; and
   setting means for setting said white balance value stored in said storage means as the white balance value for white balance processing on the taken image by a new picture taking.

8. The white balance processing apparatus according to claim 1, further comprising:
   setting enabling means for enabling a setting of said white balance value only when there is a coincidence between presence/absence of flash emission for the taken image and presence/absence of flash emission for image taken at the time of acquiring the white balance value set for the white balance processing of said taken image.

9. A white balance processing method comprising the steps of:
   storing a white balance value employed in white balance processing of a past taken image into a non-volatile memory;
   setting said stored white balance value employed in the past as a custom white balance value for the taken image by a new picture taking; and
   effecting white balance processing on the taken image based on said set custom white balance value;

wherein said stored white balance value employed in the past is a white balance value detected from the taken image subjected to processing in the past and corrected based on an instruction from a photographer, and is the white balance value employed in white balance processing of the taken image.

10. The white balance processing method according to claim 9, wherein said stored white balance value employed in the past is a white balance value read out of a previously stored preset white balance value and corrected based on said instruction from the photographer and is the white balance value employed in the white balance processing of the taken image.

11. A computer-readable medium encoded with computer-executable white balance processing instructions including the procedures of:
  storing a white balance value employed in white balance processing of a past taken image into a non-volatile memory;
  setting said stored white balance value employed in the past as a custom white balance value for the taken image by a new picture taking; and
  effecting white balance processing on the taken image based on said set custom white balance value;
  wherein said stored white balance value employed in the past is a white balance value detected from the taken image subjected to processing in the past and corrected based on an instruction from a photographer, and is the white balance value employed in white balance processing of the taken image.

12. A digital camera, including a white balance processing apparatus, the apparatus comprising:
  white balance processing means for effecting white balance processing on a taken image based on a set white balance value;
  non-volatile storage means for storing white balance values set for the taken image obtained at the time of past image taking and employed in said white balance processing;
  custom value setting means for setting a white balance value employed in the past, stored in the storage means as a custom white balance value for the taken image by a new picture taking;
  detected value setting means for detecting and setting a white balance value to be set to said white balance processing means from the taken image;
  correction means for correcting said detected white balance value; and
  corrected detected value setting means for setting said corrected detected white balance value to said white balance processing means;
  wherein said storage means additionally stores said corrected detected white balance value set to and employed in said white balance processing means as a white balance value employed in the past.

13. The digital camera according to claim 12, wherein the white balance processing apparatus further comprises:
  setting enabling means for enabling a setting of said white balance value only when there is a coincidence between presence/absence of flash emission for the taken image and presence/absence of flash emission for image taken at the time of acquiring the white balance value set for the white balance processing of said taken image.

* * * * *